United States Patent
Zhang et al.

(10) Patent No.: US 10,937,064 B2
(45) Date of Patent: Mar. 2, 2021

(54) METHOD AND APPARATUS FOR PROVIDING CONTENT

(71) Applicant: SAMSUNG ELECTRONICS CO., LTD., Suwon-si (KR)

(72) Inventors: Wenbo Zhang, Beijing (CN); Yanli Li, Beijing (CN); Chao Yan, Beijing (CN); Junjun Xiong, Beijing (CN); Zhixuan Li, Beijing (CN)

(73) Assignee: SAMSUNG ELECTRONICS CO.. LTD., Suwon-si (KR)

(*) Notice: Subject to any disclaimer, the term of this patent is extended or adjusted under 35 U.S.C. 154(b) by 385 days.

(21) Appl. No.: 15/176,763

(22) Filed: Jun. 8, 2016

(65) Prior Publication Data

US 2016/0358225 A1 Dec. 8, 2016

(30) Foreign Application Priority Data

Jun. 8, 2015 (CN) .......................... 201510308816.5
May 16, 2016 (KR) ........................ 10-2016-0059776

(51) Int. Cl.
*G06Q 30/00* (2012.01)
*G06Q 30/02* (2012.01)
*G06F 16/583* (2019.01)

(52) U.S. Cl.
CPC ..... *G06Q 30/0271* (2013.01); *G06F 16/5838* (2019.01)

(58) Field of Classification Search
CPC .......... G06Q 30/0271; G06Q 30/0261; G06Q 30/0257; G06Q 30/02; G06Q 30/0256; G02B 27/0093; G02B 2027/0138; G02B 2027/014; G06K 9/00617; G06K 9/0061; G06K 9/00604; G06T 19/006; G06F 16/5838

USPC ....................................................... 705/14.66
See application file for complete search history.

(56) References Cited

U.S. PATENT DOCUMENTS

| | | | |
|---|---|---|---|
| 7,921,036 B1* | 4/2011 | Sharma | G06Q 20/3674 705/14.49 |
| 8,128,342 B2 | 3/2012 | Dunn et al. | |
| 9,189,886 B2* | 11/2015 | Black | G06Q 30/0601 |
| 9,454,646 B2* | 9/2016 | Siefert | G09B 7/073 |
| 10,620,700 B2* | 4/2020 | Publicover | G02B 27/0172 |
| 2012/0030006 A1 | 2/2012 | Yoder et al. | |
| 2012/0158775 A1 | 6/2012 | Choi et al. | |
| 2013/0204825 A1 | 8/2013 | Su | |
| 2013/0290108 A1* | 10/2013 | Machado | G06Q 30/02 705/14.66 |

(Continued)

FOREIGN PATENT DOCUMENTS

WO 2012071690 A1 6/2012

OTHER PUBLICATIONS

Algorithms + Data Structures = Programs, 1976, pp. ix-55.*

(Continued)

*Primary Examiner* — David J Stoltenberg
*Assistant Examiner* — Michael I Ezewoko
(74) *Attorney, Agent, or Firm* — Sughrue Mion, PLLC

(57) ABSTRACT

A method of providing content includes acquiring user profile information from an image of a user of an electronic apparatus configured to provide content to the user, acquiring context information from a surrounding environment of the electronic apparatus, and providing content to the user based on the user profile information and the context information.

14 Claims, 19 Drawing Sheets

(56) References Cited

U.S. PATENT DOCUMENTS

| | | |
|---|---|---|
| 2014/0132400 A1 | 5/2014 | Heaven et al. |
| 2015/0128158 A1 | 5/2015 | Wheatley |
| 2016/0188962 A1* | 6/2016 | Taguchi .................... G06T 7/73 |
| | | 382/117 |

OTHER PUBLICATIONS

HCI remixed : reflections on works that have influenced the HCI community, MIT Press, 2008: pp. 275-279.*
Why a Diagram is (Sometimes) Worth Ten Thousand Words, Larkin, Simon, Cognitive Science, 1987, pp. 65-100.*
Streetlights and Shadows, MIT Press, 2009, pp. 33-47.*
The future of the internet—and how to stop It, Yale University Press, 2008, Chapter(s) 1-9, [emphasis pp. 11-18].*
Communication dated Aug. 24, 2016, issued by the International Searching Authority in counterpart International Application No. PCT/KR2016/006074 (PCT/ISA/220, 210, 237).

\* cited by examiner

METHOD AND APPARATUS FOR PROVIDING CONTENT

CROSS-REFERENCE TO RELATED APPLICATIONS

This application claims the benefit of Korean Patent Application No. 10-2016-0059776, filed on May 16, 2016, in the Korean Intellectual Property Office, and Chinese Patent Application No. 201510308816.5, filed on Jun. 8, 2015, in the State Intellectual Property Office of P.R.C., the disclosures of which are incorporated herein by reference in their entireties.

BACKGROUND

1. Field

Apparatuses and methods consistent with exemplary embodiments relate to generating and providing content by using profile information of a user and context information of a device.

2. Description of the Related Art

In the digital age, as various types of content are provided, many systems for recommending interesting content to users are being developed. For example, a content recommendation system gathers user information through a camera, and recommends content to the users based on the gathered information. The user information may include superficial information of the users, such as gender, age, colors and styles of clothing, facial expressions, and the like.

However, it is difficult to evaluate whether the user information appropriately matches a recommended item. For example, when a user is detected as a young woman, the content recommendation system may determine that the user is interested in cosmetics, but it may not be capable of recommending a specific brand name or type of cosmetics. When matching rates between user features and recommended content are low, the recommendations may be ineffective. Therefore, there is an increasing need for a system that is capable of more specifically recommending content.

SUMMARY

Provided are a method and apparatus for generating and providing user-specific content by using profile information of a user and context information of a device.

Additional aspects will be set forth in part in the description which follows and, in part, will be apparent from the description, or may be learned by practice of the presented exemplary embodiments.

According to an aspect of an exemplary embodiment, there is provided a method of providing content, the method including acquiring a user profile information from an image of a user of an electronic apparatus configured to provide a content to the user; acquiring a context information from a surrounding environment of the electronic apparatus; and providing content to the user based on the user profile information and the context information.

The providing the content may include: determining an advertisement element to be recommended to the user based on the user profile information and the context information; and generating the content by using the determined advertisement element.

The advertisement element may include at least one among an item to be recommended to the user, a background screen of the content, background music of the content, characters appearing in the content, and a story of the content.

The determining the advertisement element may be based on at least one among the user profile information, the context information, and a combination of the user profile information and the context information.

The user profile information may include at least one among gender, age, ethnicity, skin status, health status, makeup style, accessory style, clothing style, preferred brand name, personality, purchasing power, and biological information of the user.

The acquiring the user profile information may include: dividing the image of the user into a plurality of areas according to a silhouette of the user; and acquiring user profile information from the plurality of areas according to the silhouette of the user.

The acquiring the user profile information may include: capturing images of a plurality of users of the electronic apparatus; classifying the plurality of users into a plurality of groups based on distances between the plurality of users; and acquiring group profile information corresponding to each group among the plurality of groups, and the providing the content may include providing group content corresponding to each group among the plurality of groups based on the group profile information and the context information.

The method may include determining a group viewpoint location from an average of viewpoint locations of members of the plurality of groups; determining a display area of a screen corresponding to the group viewpoint location; and displaying the group content on the display area of the screen.

The context information may include at least one among location information of the electronic apparatus, time information, weather information, holiday information, and current hot issue information.

The acquiring the context information may include receiving the context information from a server or a separate preset apparatus, and the separate preset apparatus is within a certain distance from the electronic apparatus.

The method may include dynamically displaying the content on an area of a screen of the electronic apparatus, the area corresponding to a viewpoint location of the user.

The dynamically displaying the content may include: tracing the viewpoint location of the user; and dynamically displaying the content on the area of the screen corresponding to the traced viewpoint location.

The dynamically displaying the content may include changing at least one among a color, a location, a shape, and a size of the area of the screen according to the viewpoint location of the user and displaying the content.

The generating the content may include: generating a plurality of pieces of content by using the advertisement element; and determining a priority of the plurality of pieces of content based on at least one among the user profile information and the context information.

According to an aspect of another exemplary embodiment, there is provided an electronic apparatus configured to provide content, the electronic apparatus including: a memory configured to store computer-executable instructions; and at least one processor configured to execute the computer-executable instructions, acquire user profile information from an image of a user of the electronic apparatus, acquire context information from a surrounding environment of the electronic apparatus, and generate content to be recommended to the user based on the user profile information and the context information.

The at least one processor may be configured to determine an advertisement element to be recommended to the user based on the user profile information and the context information, and generate the content by using the determined advertisement element.

The advertisement element may include at least one among an item to be recommended to the user, a background screen of content, background music of the content, characters appearing in the content, and a story of the content.

The at least one processor may be configured to determine the advertisement element based at least one among the user profile information, the context information, and a combination of the user profile information and the context information.

The at least one processor may be configured to classify a plurality of users, from captured images of the plurality of users of the electronic apparatus, into a plurality of groups based on distances between the plurality of users, acquire group profile information corresponding to each group among the plurality of groups, and provide group content corresponding to each group among the plurality of groups based on the group profile information and the context information.

According to an aspect of another exemplary embodiment, there is provided a non-transitory computer-readable recording medium having recorded thereon a program, which, when executed by a computer, performs a method.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Hereinafter, one or more exemplary embodiments will now be described more fully with reference to the accompanying drawings. As used herein, the term "and/or" includes any and all combinations of one or more of the associated listed items. Expressions such as "at least one of," when preceding a list of elements, modify the entire list of elements and do not modify the individual elements of the list.

The terms used in the exemplary embodiments are selected as general terms used currently as widely as possible considering the functions in the present disclosure, but they may depend on the intentions of one of ordinary skill in the art, legal practice, the appearance of new technologies, etc. In some cases, terms arbitrarily selected by the applicant are also used, and in such cases, their meaning will be described in detail. Thus, it should be noted that the terms used in the specification should be understood not based on their literal names but by their given definitions and descriptions through the specification.

While terms such as "first," "second," etc., may be used to describe various components, such components are not limited to the aforementioned terms. The aforementioned terms are used only to distinguish one component from another.

The terms used herein are selected to describe one or more exemplary embodiments, and are not used to limit the spirit and scope of the inventive concept. An expression used in the singular encompasses the expression of the plural, unless it has a clearly different meaning in the context. Also, when a portion "includes" an element, another element may be further included, rather than excluding the existence of the other element, unless otherwise described.

The use of the terms "a" and "an" and "the" and similar references in the context of describing exemplary embodiments, especially in the context of the following claims, are to be construed to cover both the singular and the plural. The steps of all methods described herein can be performed in any suitable order unless otherwise indicated herein or otherwise clearly contradicted by context. The exemplary embodiments are not limited to the described order of the steps.

In the present specification, expressions such as "in some exemplary embodiments" or "in an exemplary embodiment" do not necessarily indicate an identical exemplary embodiment.

Some exemplary embodiments may be shown with functional blocks and various processing operations. Some or all of the functional blocks may be implemented with various numbers of hardware and/or software that perform specific functions.

Hereinafter, exemplary embodiments will be described in detail with reference to the accompanying drawings.

Figure 1A:
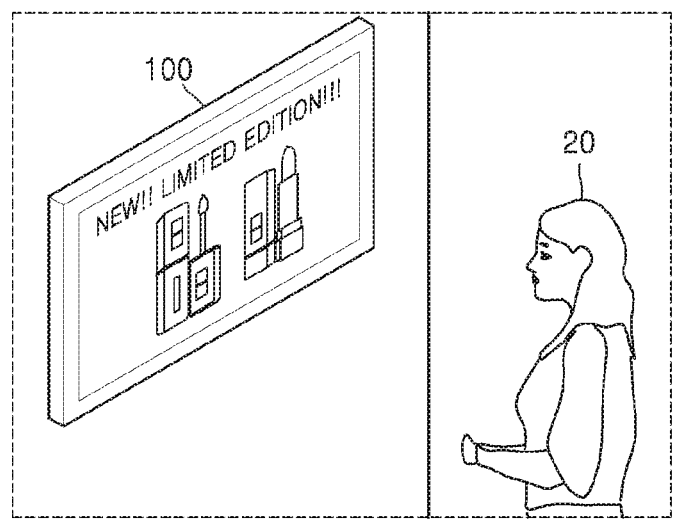
FIGS. 1A and 1B are diagrams illustrating an electronic apparatus that provides and displays content for users, according to an exemplary embodiment.
Figure 1B:
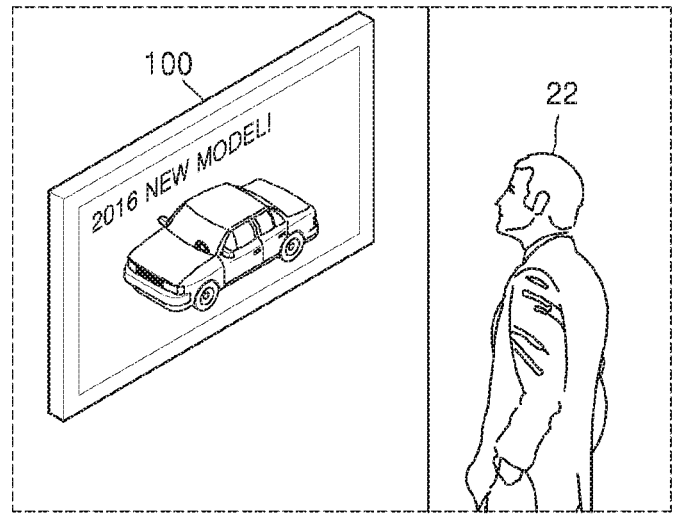

FIGS. 1A and 1B are diagrams for describing an electronic apparatus 100 that provides and displays content for users, according to an exemplary embodiment.

As shown in FIGS. 1A and 1B, the electronic apparatus 100 may create and display content according to users of the electronic apparatus 100.

Referring to FIG. 1A illustrated according to an exemplary embodiment, the electronic apparatus 100 may capture an image of a female user 20. Also, the electronic apparatus 100 may capture an image of a male user 22 as shown in FIG. 1B.

The electronic apparatus 100 may acquire user profile information from a captured user image. Also, the electronic apparatus 100 may capture images of a plurality of users to acquire a plurality of pieces of user profile information.

The electronic apparatus 100 may acquire context information that represents a surrounding environment of the electronic apparatus 100. For example, the electronic apparatus 100 may acquire weather or location information of the surrounding environment of the electronic apparatus 100.

According to an exemplary embodiment, the electronic apparatus 100 may create content to be recommended to a user based on profile information of the user and the context information. The electronic apparatus 100 may display the created content.

Referring to FIG. 1A, the electronic apparatus 100 may acquire the user profile information, such as gender of the user, a type of accessory, a skin type, a clothing style, etc., from a captured image of the user. For example, the electronic apparatus 100 may detect preference of the female user from an image captured in FIG. 1A. The electronic apparatus 100 may create and display an advertisement related to an item to be recommended to the user based on the user's preference. For example, the electronic apparatus 100 may display content related to cosmetics.

Also, the electronic apparatus 100 may detect preference of the male user from an image captured in FIG. 1B. The electronic apparatus 100 may create and display an advertisement related to an item to be recommended to the user based on the user's preference. For example, the electronic apparatus 100 may display content related to a car advertisement.

Figure 2:
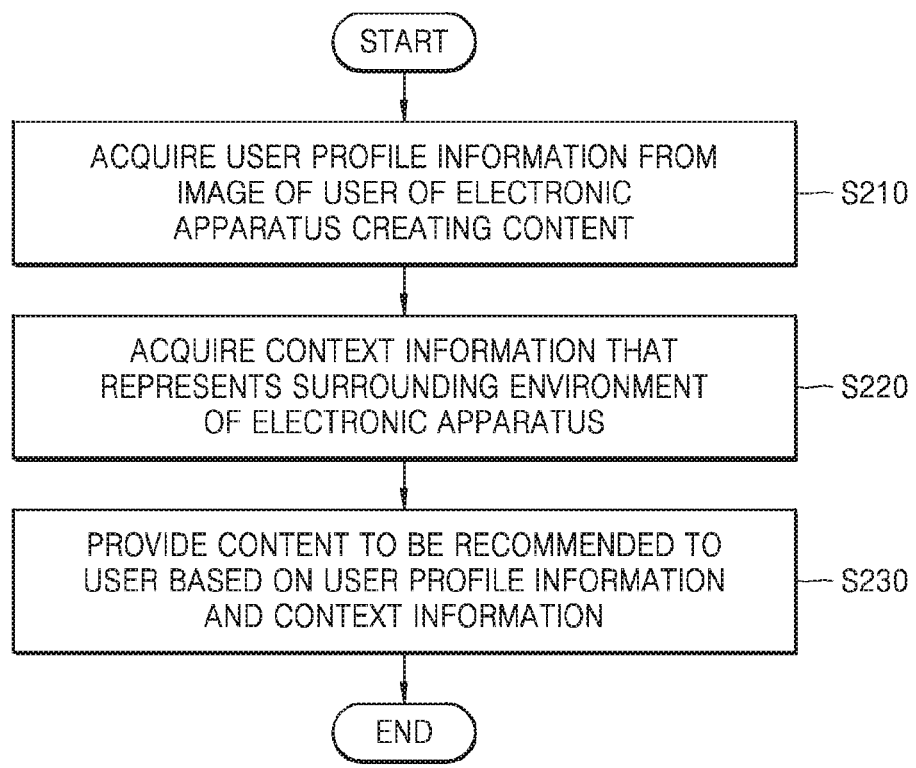
FIG. 2 is a flowchart of a method of providing content, performed by an electronic apparatus, according to an exemplary embodiment.

FIG. 2 is a flowchart of a method of providing content, performed by the electronic apparatus 100, according to an exemplary embodiment.

In operation S210, the electronic apparatus 100 for providing content may capture an image of a user and acquire user profile information from the captured image.

The user profile information may be acquired from the captured image of the user. The electronic apparatus 100 may capture an image of the user by using a camera. The electronic apparatus 100 may store the acquired user profile information.

Before capturing the image of the user, the electronic apparatus 100 may detect a location of the user by using a sensor. Also, the electronic apparatus 100 may control rotations and angles of the camera to focus on the detected user.

The user profile information may indicate overall information of the user. The user profile information may include at least one of, but is not limited to, gender, age, ethnicity, skin status, health status, makeup style, accessory style, clothing style, preferred brand names, personality, purchasing power, and biological information of the user.

In operation S220, the electronic apparatus 100 may acquire context information that represents a surrounding environment of the electronic apparatus 100.

The electronic apparatus 100 may acquire the context information that represents the surrounding environment of the electronic apparatus 100 by using a sensor, a camera, or the like of the electronic apparatus 100. Alternatively, the electronic apparatus 100 may acquire the context information of the electronic apparatus 100 through a network. The electronic apparatus 100 may acquire the context information of the electronic apparatus 100 via a server.

The electronic apparatus 100 may receive the context information from another device with predetermined authority. In this case, the other device may be within a predetermined distance from the electronic apparatus 100. However, the location of the other device is not limited thereto.

The context information may include at least one of, but is not limited to, location information of the electronic apparatus 100, time information, weather information, holiday information, and current hot issue information.

The electronic apparatus 100 may store the context information. The electronic apparatus 100 may perform real-time update on the context information.

In operation S230, the electronic apparatus 100 may provide content to be recommended to the user based on the user profile information and the context information. The electronic apparatus 100 may provide user-specific content that is created by using both the user profile information and the context information.

The electronic apparatus 100 may include predetermined advertisement elements. For example, the electronic apparatus 100 may include background music, a story of content, characters appearing in the content, and the like that have been created in advance. The electronic apparatus 100 may create content by combining the predetermined advertisement elements.

For example, when the electronic apparatus 100 acquires a profile of a female user with a plurality of accessories on a rainy day, the electronic apparatus 100 may recommend an umbrella based on a preference of the female user. Next, the electronic apparatus 100 may create content in which a female celebrity with an umbrella appears. The electronic apparatus 100 may display the content to show an umbrella advertisement to the user.

Also, according to an exemplary embodiment, the electronic apparatus 100 may recommend a plurality of pieces of content to the user. For example, the electronic apparatus 100 may simultaneously recommend an umbrella and a car. Then, the electronic apparatus 100 may create content in which a female celebrity steps out from a car and opens her umbrella on a rainy day. The electronic apparatus 100 may display the content to show an advertisement about both umbrellas and cars to the user.

Figure 3:
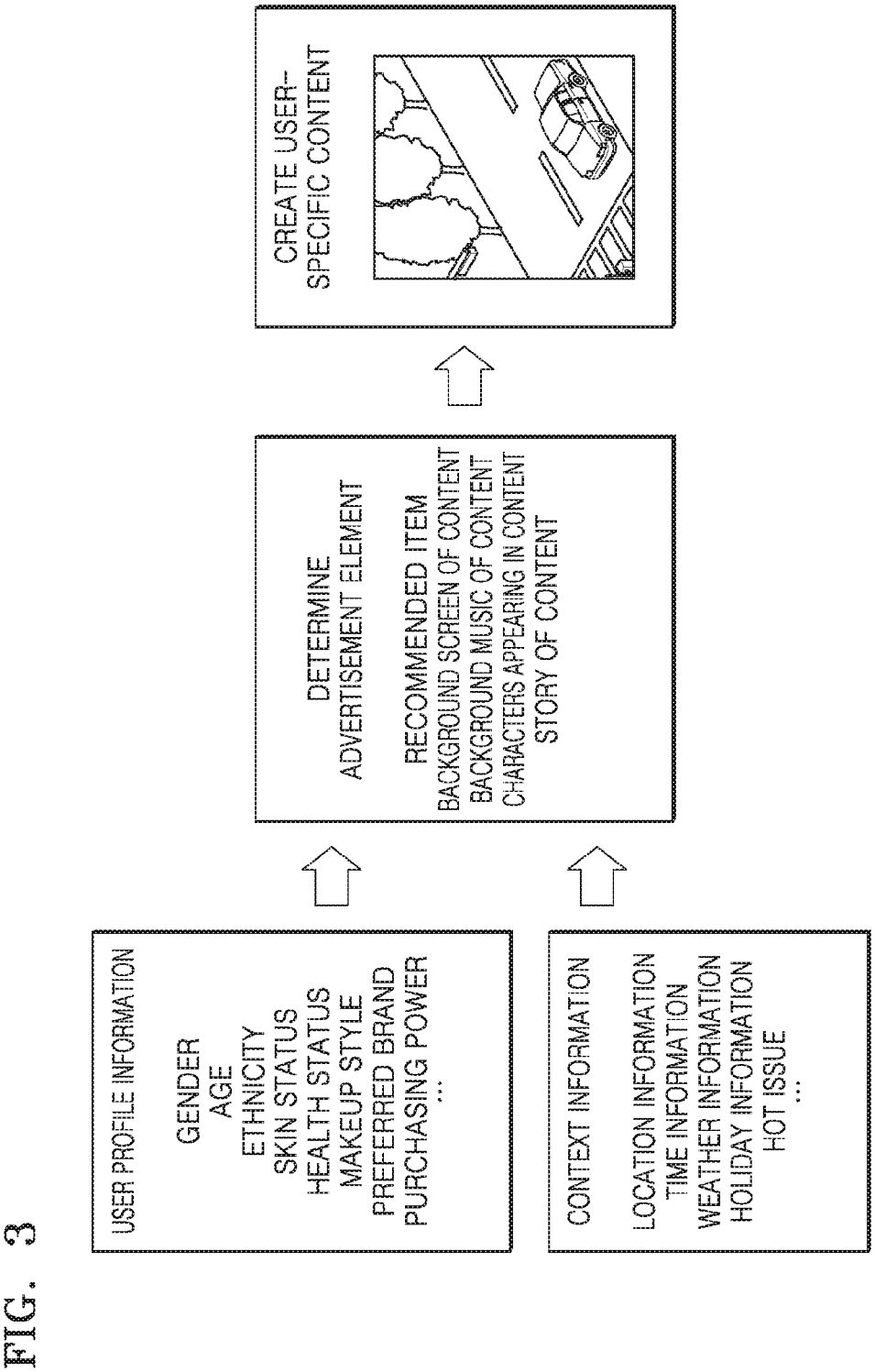
FIG. 3 is a diagram illustrating generation of user-specific content by using user profile information and context information, according to an exemplary embodiment.

FIG. 3 is a diagram for describing generation of user-specific content by using user profile information and context information, according to an exemplary embodiment.

As shown in FIG. 3, the electronic apparatus 100 may determine an advertisement element based on user profile information and context information. Also, the electronic apparatus 100 may generate user-specific content from the determined advertisement element.

According to an exemplary embodiment, the advertisement element may include at least one of, but is not limited to, an item to be recommended to the user, a service to be recommended to the user, a background screen of content, background music of the content, characters appearing in the content, and a story of the content.

According to an exemplary embodiment, the advertisement element may include a predetermined element. For example, the electronic apparatus 100 may include background music and story of the content that are determined in advance in a memory of the electronic apparatus 100.

The electronic apparatus 100 may create content by combining at least one of the determined advertisement element. Also, the electronic apparatus 100 may create new content by adding at least one advertisement element to content that is created in advance.

A recommended item and a recommended service may be determined based on the user profile information. The electronic apparatus 100 may determine at least one recommended item and recommended service.

The electronic apparatus 100 may first determine a plurality of recommended items. Second, the electronic apparatus 100 may determine relative items from among the determined recommended items.

The user profile information may be configured of the user's personal profile information and group profile information. The personal profile information may include information that is acquired by analyzing personal features of the user. Also, the group profile information may include information acquired based on relationships between a plurality of users.

According to an exemplary embodiment, the user profile information may include outer appearance information of the user. For example, the user profile information may include outer appearance features of the user, and profile information such as gender, age, ethnicity, clothing style, makeup style, health status, posture, and the like of the user. According to an exemplary embodiment, gender, age, ethnicity, and makeup style may be acquired based on facial features of the user.

Also, according to an exemplary embodiment, the health status of the user may be acquired based on the facial features and posture of the user.

According to an exemplary embodiment, a user profile about emotional status of the user may be acquired by analyzing facial expressions and body gestures. The user profile about the emotional status of the user may include, but is not limited to, happiness, sadness, anger, and the like.

According to an exemplary embodiment, the user profile information may include personality of the user. According to an exemplary embodiment, the personality of the user may include at least one of diligence, emotional stability, extrovertedness, experience open-mindedness, kindness, thoughtfulness, confidence, and loneliness.

According to an exemplary embodiment, the electronic apparatus 100 may determine a new advertisement element or a final advertisement element based on mapping relationships between the advertisement elements. The electronic apparatus 100 may determine an advertisement element based on a mapping relationship between at least two of a recommended item, a recommended service, background music of content, a background screen of the content, a story of the content, and characters appearing in the content.

The electronic apparatus 100 may determine a mapping relationship between the advertisement elements based on statistical data. The statistical data may be quantified and/or normalized according to predetermined processes. The statistical data may be acquired, but is not limited to, based on data of an online shopping mall. For example, the statistical data may be acquired based on relationships between the number of times a certain item has been clicked on a webpage, the number of purchasers, purchaser information, searched times, and similar items in a website of the online shopping mall.

The electronic apparatus 100 may thoroughly set a mapping relationship between the advertisement elements. For example, when a first recommended item is a piece of clothing, the electronic apparatus 100 may select shoes as a second recommended item based on a color, a size, a price, and a brand name of the clothing. In order to select the shoes as the second recommended item, the electronic apparatus 100 may consider shoes that are in a mapping relationship with the clothing, i.e., the first recommended item. The first recommended item may be determined based on profile data of the user and the context information. The electronic apparatus 100 may additionally determine a new advertisement element based on the determined first recommended item and the second recommended item.

According to an exemplary embodiment, the electronic apparatus 100 may determine a new item from a recommended item based on Equation 1 below.

$$E(product_{j1}, product_{j2} | model_2) = \sum_{(p,q)} \beta_{(p,q)} E(product_{j2} profile_p, product_{j2} profile_q | model_2)$$ [Equation 1]

wherein $product_{j1}$ and $product_{j2}$ may indicate advertisement elements, $model_2$ may indicate a recommended item, and may indicate a weight. Based on predetermined advertisement elements, the electronic apparatus 100 may determine a recommended item that is a new advertisement element. However, the electronic apparatus 100 may recommend new items based on the advertisement elements in methods other than that described above.

Figure 4:
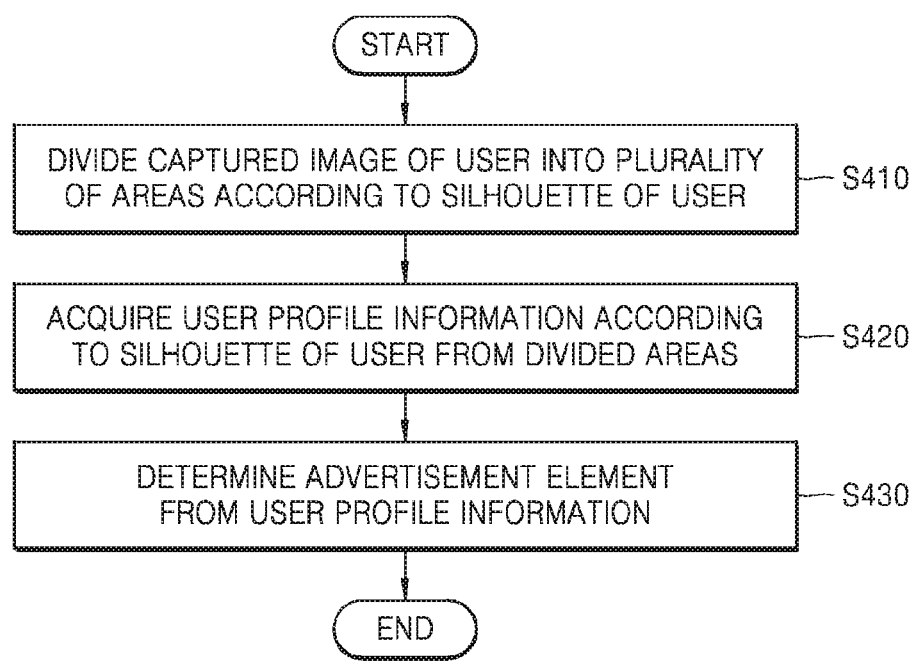
FIG. 4 is a flowchart of a method of acquiring user profile information based on a silhouette of a user, according to an exemplary embodiment.

FIG. 4 is a flowchart of a method of acquiring user profile information based on a silhouette of a user, according to an exemplary embodiment.

In operation S410, the electronic apparatus 100 may divide a captured image of a user into a plurality of areas according to a silhouette of the user.

The electronic apparatus 100 may acquire a captured image of the silhouette of the user by using a camera module. The electronic apparatus 100 may detect the silhouette of the user.

The electronic apparatus 100 may detect the silhouette of the user according to body parts of the user. For example, the electronic apparatus 100 may partially detect the head, arms, body, legs, neck, feet, etc. of the user. The electronic apparatus 100 may divide the image into partial areas according to the detected body parts of the user.

In operation S420, the electronic apparatus 100 may acquire user profile information according to the silhouette of the user from the divided areas.

The electronic apparatus 100 may acquire the user profile information from the plurality of areas that are divided according to the body parts of the user. For example, the electronic apparatus 100 may identify an arm of the user and acquire an accessory on the arm as the user profile information. Also, the electronic apparatus 100 may acquire the user profile information identifying the brand name, color, size, numbers, etc. of the accessory of the user.

The electronic apparatus 100 may acquire a plurality of pieces of user profile information from a plurality of areas. According to an exemplary embodiment, the electronic apparatus 100 may acquire at least one piece of user profile information from a single area.

In operation S430, the electronic apparatus 100 may determine an advertisement element from the user profile information.

The electronic apparatus 100 may determine a plurality of advertisement elements from a single piece of user profile information. Alternatively, the electronic apparatus 100 may determine a plurality of advertisement elements from a plurality of pieces of user profile information.

The advertisement element may include at least one of an item and service to be recommended to the user, a background screen, background music, appearing characters, and a story of the content.

Figure 5A:
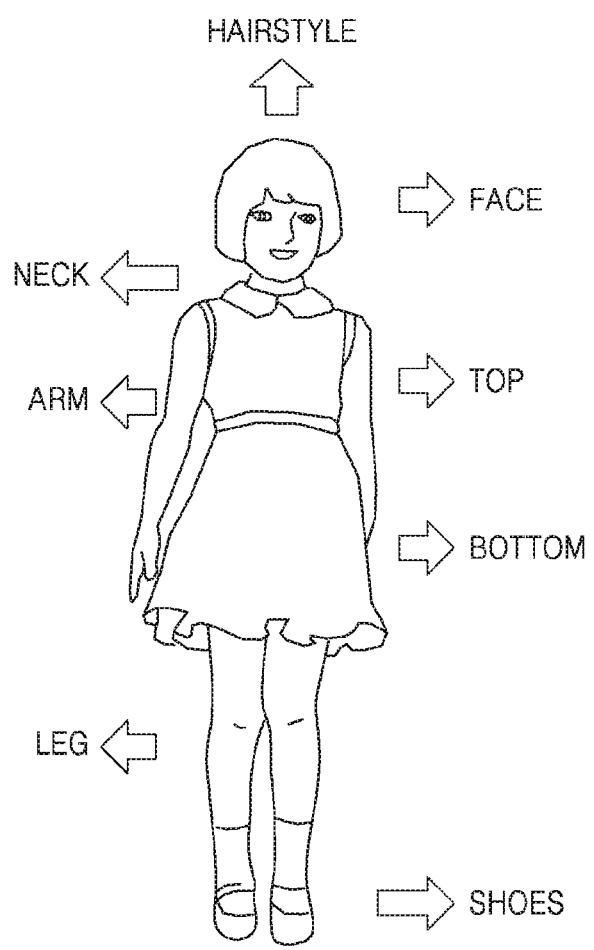
FIGS. 5A and 5B are diagrams illustrating acquiring user profile information based on a silhouette of a user and determining of advertisement elements based on the user profile information, according to an exemplary embodiment.
Figure 5B:
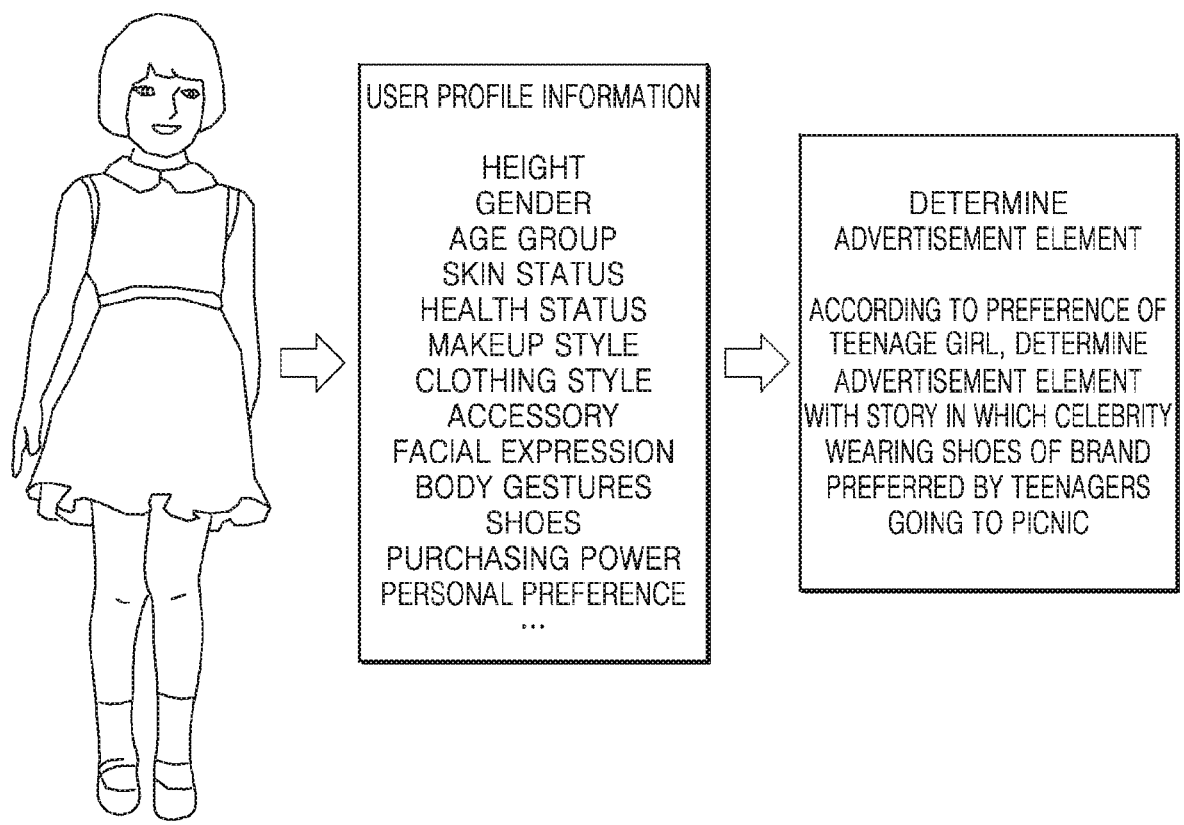

FIGS. 5A and 5B are diagrams for describing acquiring of user profile information based on a silhouette of a user and determining of advertisement elements based on the user profile information, according to an exemplary embodiment.

As shown in FIG. 5A, the electronic apparatus 100 may detect a silhouette of each body part of the user. The electronic apparatus 100 may divide an image of the user into partial areas according to the detected silhouettes. For example, the electronic apparatus 100 may classify an image of the user as a facial image, a limb image, and a body image.

According to an exemplary embodiment, the electronic apparatus 100 may acquire user profile information based on images classified according to body parts of the user. According to an exemplary embodiment, the electronic apparatus 100 may acquire the user profile information based on a makeup style from a facial image. Alternatively, the electronic apparatus 100 may acquire the user profile information by analyzing clothes shown on a limb image or a body image based on a clothing style.

In particular, as shown in FIG. 5A, the electronic apparatus 100 may classify the image of the user as a hair image, a facial image, a left arm image, a bag image, a left leg image, a skirt image, a left shoe image, a right shoe image, a right leg image, a coat image, a right arm image, a glasses image, and the like. However, the classification of the image of the user is not limited to the above.

The electronic apparatus 100 may acquire the user profile information based on the classified images of the user. For example, the electronic apparatus 100 may analyze the facial image of the user to acquire the user profile information such as gender, age, ethnicity, facial expression, skin status, and outer appearance.

According to an exemplary embodiment, the electronic apparatus 100 may analyze the left arm image, the right arm image, the left leg image, and the right leg image of the user to acquire the user profile information such as strength, health status, and a body size of the user.

According to an exemplary embodiment, the electronic apparatus 100 may analyze the bag image, the glasses image, the left shoe image, the right shoe image, the skirt image, and the coat image to acquire the user profile information such as a brand name and price preferred by the user, and features of an appropriate item. However, exemplary embodiments are not limited to the above.

Also, the electronic apparatus 100 may acquire profile information about purchasing power of the user based on images of items worn by the user. The profile information about the purchasing power may be acquired based on brand name information of the items.

According to an exemplary embodiment, the electronic apparatus 100 may analyze the glasses image to acquire information such as functions, a brand name, a design, and a size of the most preferred glasses of the user.

According to an exemplary embodiment, the electronic apparatus 100 may analyze facial expressions shown on the facial image of the user and physical movements shown on the body image of the user to acquire profile information about personality of the user.

Also, the electronic apparatus 100 may quantify the user profile information. Also, the electronic apparatus 100 may determine an advertisement element based on the quantified user profile information.

Referring to FIG. 5B, the electronic apparatus 100 may determine the advertisement element based on the user profile information.

The electronic apparatus 100 may first determine an item or service to be recommended to the user based on at least one piece of user profile information.

When the electronic apparatus 100 determines the item or service to be recommended to the user, the electronic apparatus 100 may determine another advertisement element to create content that includes the item or service.

The electronic apparatus 100 may determine the other advertisement element based on the user profile information and the predetermined item or service. For example, the electronic apparatus 100 may acquire user profile information of a male user in his forties or fifties wearing a high quality navy suit and black shoes. The electronic apparatus 100 may analyze facial characteristics of the user and thus determine that the user has diligence, confidence, good emotional stability, introvertedness, and strong purchasing power. The electronic apparatus 100 may recommend a black business car, a high quality black polo shirt, and a luxurious watch of a certain brand name. Also, with regard to the recommended item and the user's profile, the electronic apparatus 100 may determine another advertisement element including, for example, classic music, fancy houses, office buildings, city traffic status, etc.

The electronic apparatus 100 may create content by combining the determined advertisement elements. The electronic apparatus 100 may combine at least one advertisement element based on a predetermined standard. For example, the electronic apparatus 100 may create content in which a man in his 40s or 50s wearing a high quality blue polo shirt and a luxurious watch is driving a black business car to an office building.

Also, the electronic apparatus 100 may create and display additional content. For example, when the time that the electronic apparatus 100 consumes for identifying the user is too long, the electronic apparatus 100 may create and display additional content.

According to another exemplary embodiment, when the electronic apparatus 100 acquires preference of a teenage girl based on the user profile information, the electronic apparatus 100 may create content for the teenage girl. For example, according to the preference of the teenage girl, the electronic apparatus 100 may determine advertisement elements such as shoes of a brand name preferred by teenagers, a picnic story, and latest popular songs. The electronic apparatus 100 may create content by combining the determined advertisement elements.

Also, the electronic apparatus 100 may create a plurality of pieces of content by using the advertisement elements. The electronic apparatus 100 may determine priority of the plurality of pieces of content based on at least one of the user profile information and the context information.

Figure 6:
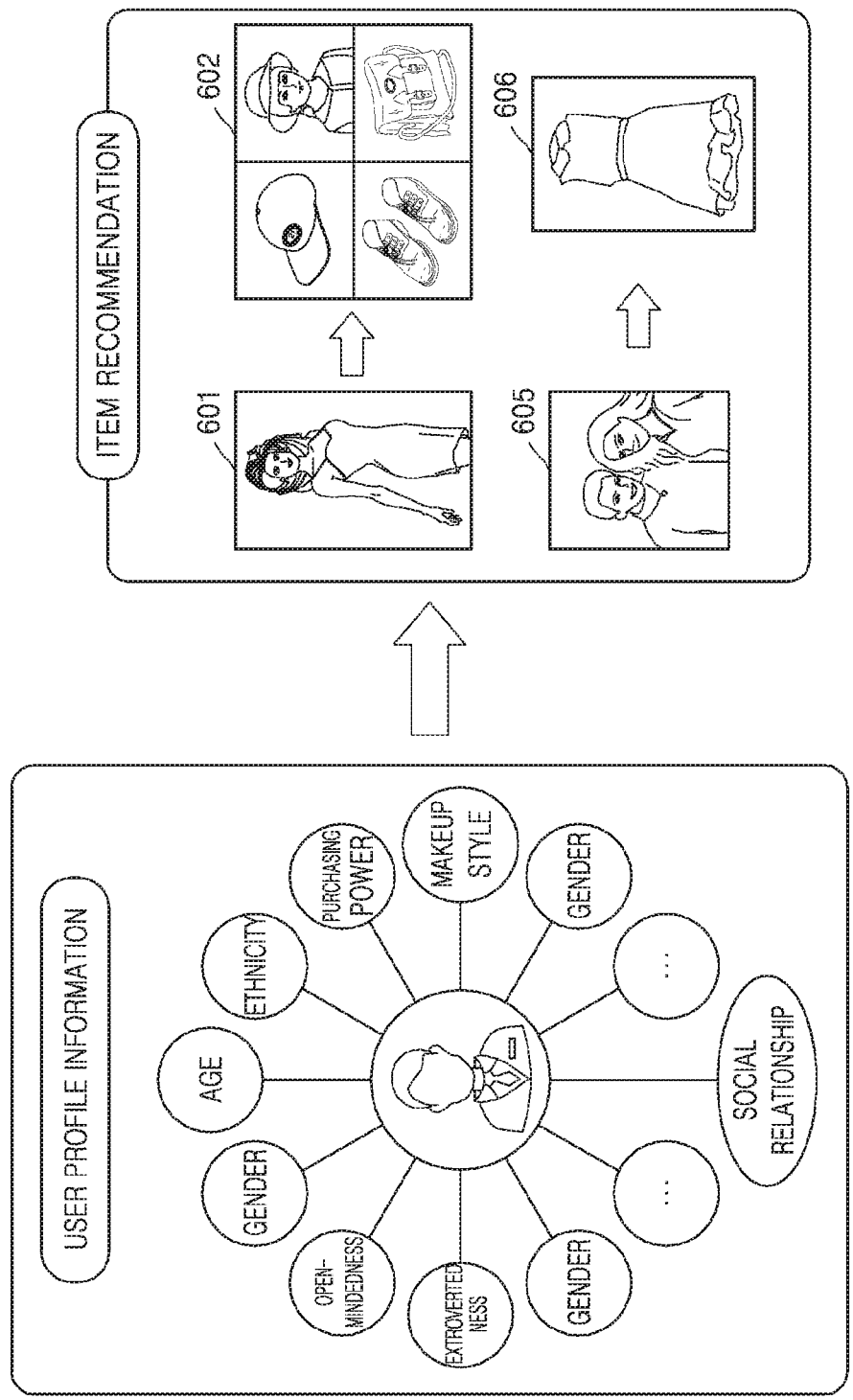
FIG. 6 is a diagram illustrating a process of recommending an item based on user profile information, according to an exemplary embodiment.

FIG. 6 is a diagram for describing a process of recommending an item based on user profile information, according to an exemplary embodiment.

According to an exemplary embodiment, the user profile information may include at least one of gender, hairstyle, age, ethnicity, skin status, health status, a makeup style, an accessory style, a clothing style, a preferred brand name, personality, purchasing power, social relationship, sociability, open-mindedness, and biological information of the user.

According to an exemplary embodiment, the electronic apparatus 100 may quantify the personality of the user based on a predetermined criterion. Also, the electronic apparatus 100 may recommend an item based on the quantified personality. According to an exemplary embodiment, the electronic apparatus 100 may set personality indexes with seven levels from '−3' to '+3.' In this case, '−3' may indicate the least matching, and '+3' may indicate the highest matching.

When one of the personality indexes, for example, an open-mindedness index, has a value of '+3,' the electronic apparatus 100 may recommend some new items such as clothes with different colors and styles from a current clothing worn by the user. On the other hand, when the open-mindedness index of the user has a value of '−3,' the electronic apparatus 100 may recommend clothes or accessories similar to the current style of the user.

The electronic apparatus 100 may acquire a profile of the user from an image of the user according to a predetermined method. The electronic apparatus 100 may predetermine an artificially quantified personality index. For example, the electronic apparatus 100 may extract user characteristics from images of a plurality of users. The electronic apparatus 100 may create a quantified personality index based on the extracted data of repeated user characteristics. Also, the electronic apparatus 100 may quantify the personality of the user into seven levels based on the extracted data of the plurality of users and psychological analysis.

For example, based on extrovertedness of the user, the extrovertedness of the user may be quantified into seven levels, including '−3, −2, −1, 0, 1, 2, and 3,' in the user profile. In this case, '−3' may indicate a lowest level of extrovertedness and '+3' may indicate a highest level of extrovertedness. According to an exemplary embodiment, when the user in an image is wearing a colorful clothing, the electronic apparatus 100 may quantify the extrovertedness of the user and set the extrovertedness to '+2' or '+3.'

The user profile information may include the user's purchasing power information. According to an exemplary embodiment, the purchasing power information may be used as an index for determining whether the user may buy an item or a service. According to an exemplary embodiment, the purchasing power information may be acquired based on price information of shoes, clothes, and accessories worn by the user.

From the captured image of the user, the electronic apparatus 100 may acquire features of the shoes, the clothes, and the accessories worn by the user. The electronic apparatus 100 may search a database to acquire brand name information or price information of an acquired item. Alternatively, the electronic apparatus 100 may determine the purchasing power of the user by using price information and brand name information of items similar to the items of the user.

According to an exemplary embodiment, the electronic apparatus 100 may acquire watch information of the user from the image of the user. The electronic apparatus 100 may extract characteristics of the user's watch. The electronic apparatus 100 may search a database to find brand name information and price information of the watch based on the characteristics of the user's watch. Alternatively, the electronic apparatus 100 may acquire the brand name information and the price information of the watch via the Internet. Alternatively, the electronic apparatus 100 may find the price information, design information, and the like of the watch based on a watch with a similar design or the same brand name as the user's watch. The electronic apparatus 100 may quantify the purchasing power of the user. For example, the electronic apparatus 100 may quantify the purchasing power of the user into seven levels. For example, when a price of the user's watch is within the upper 10% of a price range of all watches in a database, the electronic apparatus 100 may determine the purchasing power of the user as a highest level.

According to an exemplary embodiment, the electronic apparatus 100 may recommend an item based on the quantified user profile information.

When the electronic apparatus 100 determines that an identified user is an unmarried woman 601, the electronic apparatus 100 may recommend an item 602 based on purchasing power, preference, personality of the unmarried woman 601. The item 602 recommended by the electronic apparatus 100 may include, for example, trendy accessories, hats, shoes, bags, and the like.

When the electronic apparatus 100 identifies the user as a woman 605 from a young couple, the electronic apparatus 100 may recommend an item 606 based on a social relationship, tendency, facial expression, preference, and the like of the woman 605. The item 606 recommended by the electronic apparatus 100 to the woman 605 may include, for example, a wedding dress.

According to an exemplary embodiment, the electronic apparatus 100 may recommend an item from the user profile based on Equation 2 below.

$$E(product_j \mid model_1, user_1) = \sum_{(p,q)} \beta_{(p,q)} E(product_j\, profile_p \mid model_1, user_1\, profile_q)$$ [Equation 2]

wherein, $product_j$ may indicate an advertisement element, $model_1$ may indicate a recommended item, $user_i$ may indicate user profile information, and $\beta_{(p,q)}$ may indicate a weight. The electronic apparatus 100 may recommend an item based on the user profile by using a method other than the aforementioned method.

Figure 7:
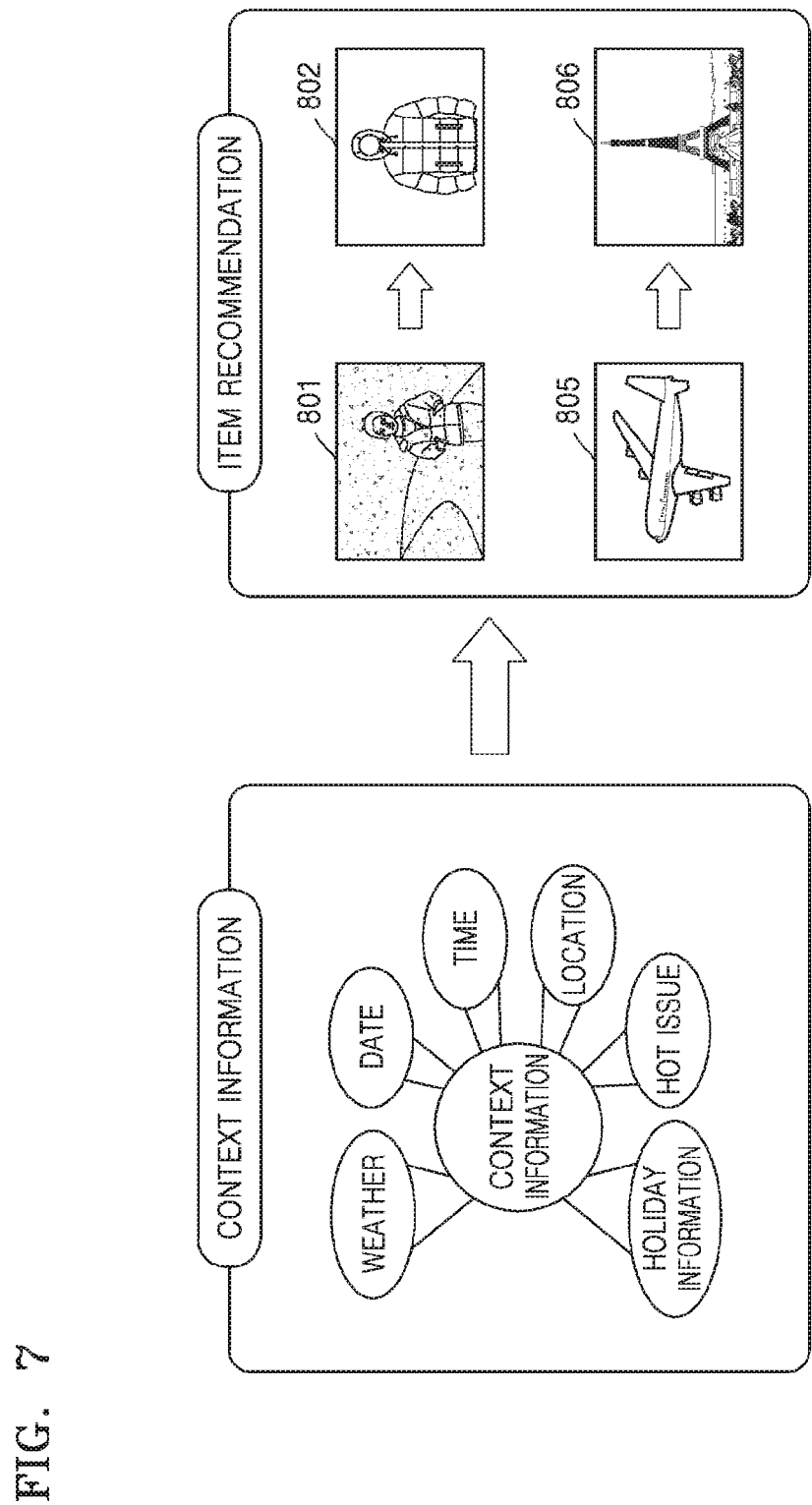
FIG. 7 is a diagram for describing a process of recommending an item based on context information, according to an exemplary embodiment.

FIG. 7 is a diagram for describing a process of recommending an item based on context information, according to an exemplary embodiment.

According to an exemplary embodiment, context information may include at least one of location information of the electronic apparatus 100, time information, weather information, holiday information, and current hot issue information.

The time information may include at least one of current data time, weather status, holiday information, and current hot issues.

The location information may include public locations, airports, waiting rooms, commercial centers, and/or the like.

The electronic apparatus 100 may receive the context information from a server or a separate preset apparatus. The separate preset apparatus may be within a predetermined distance from the electronic apparatus 100.

The electronic apparatus 100 may receive the context information via a network. The electronic apparatus 100 may update the context information in real time.

The electronic apparatus 100 may recommend an item based on the context information. Accordingly, the electronic apparatus 100 may create content that is appropriate for current time and space.

According to an exemplary embodiment, the electronic apparatus 100 may acquire current weather information from the context information. When the current weather is a snowing situation 801, the electronic apparatus 100 may recommend a down jacket as a recommended item 802. Alternatively, the electronic apparatus 100 may determine an item related to cold-proof goods as the recommended item 802.

According to an exemplary embodiment, the electronic apparatus 100 may detect that a current location is an airport based on the context information. The electronic apparatus 100 may recommend a service related to travelling to the user as a recommended service 806. Alternatively, the electronic apparatus 100 may recommend travelling items such as travel bags, carry-on items, etc. According to an exemplary embodiment, the electronic apparatus 100 may recommend a plurality of items or services to the user.

According to an exemplary embodiment, the electronic apparatus 100 may recommend an item from the context information based on Equation 3 below.

$$E(product_j \mid model_3, context) = \sum_{(p,q)} \beta_{(p,q)} E(product_{j1} profile_p \mid model_3, context\ profile_q) \quad \text{[Equation 3]}$$

wherein, $product_j$ may indicate an advertisement element, $model_3$ may indicate a recommended item, context, may indicate context information, and $\beta_{(p,q)}$ may indicate a weight. The electronic apparatus 100 may recommend an item based on the context information by using a method other than the aforementioned method.

Figure 8:
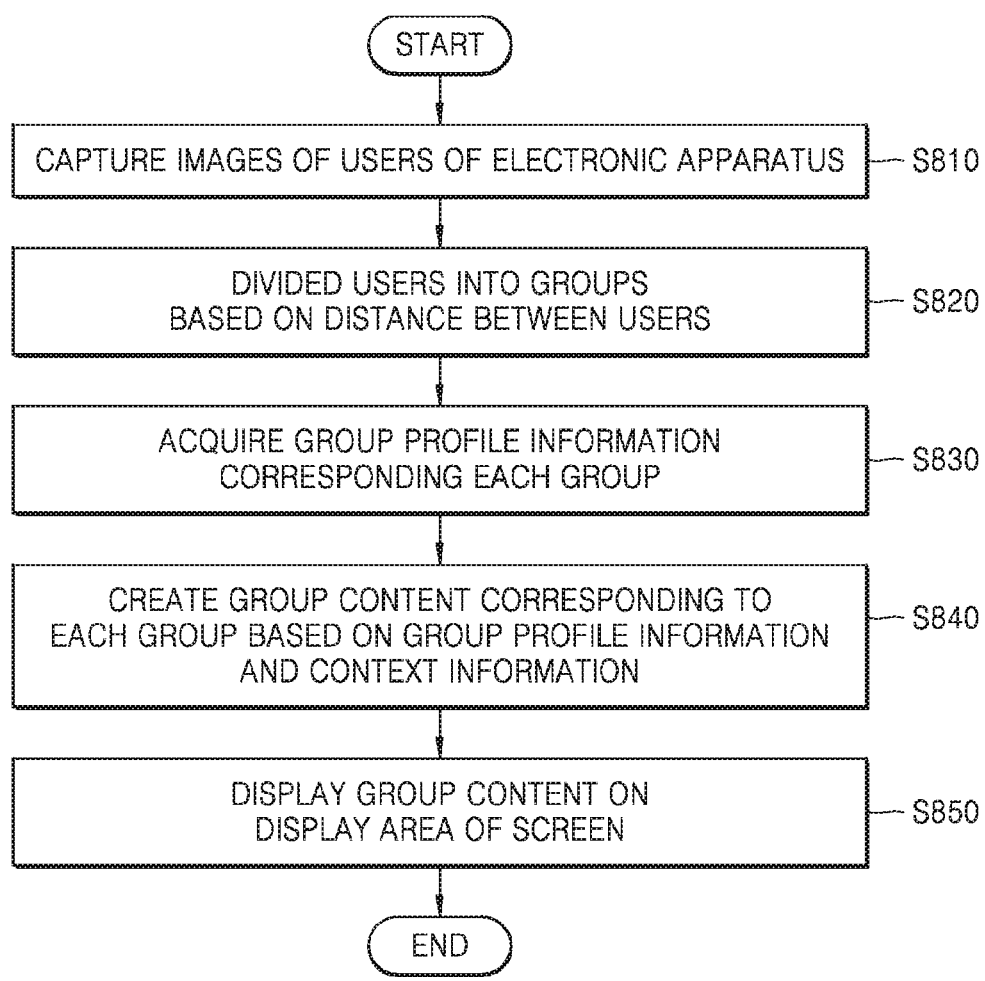
FIG. 8 is a flowchart of a method of dividing a plurality of users into a plurality of groups and providing group content, according to an exemplary embodiment.

FIG. 8 is a flowchart of a method of dividing a plurality of users into a plurality of groups and providing group content, according to an exemplary embodiment.

In operation S810, the electronic apparatus 100 may capture images of a plurality of users of the electronic apparatus 100.

The electronic apparatus 100 may detect the plurality of users by using at least one camera module. The electronic apparatus 100 may acquire images of the plurality of users through photographs of the plurality of users.

In operation S820, the electronic apparatus 100 may divide the plurality of users into a plurality of groups based on a distance between the plurality of users.

When the distance between the plurality of users is smaller than a predetermined distance, the electronic apparatus 100 may determine that the plurality of the users are acquaintances. For example, the electronic apparatus 100 may detect two users. The electronic apparatus 100 may determine two users that have their arms crossed or are holding hands as a couple, friends, or family. The electronic apparatus 100 may determine a social relationship between the plurality of users based on the distance between the plurality of users.

Based on the social relationship between the plurality of users, the electronic apparatus 100 may group the plurality of users into at least one group.

According to another exemplary embodiment, the electronic apparatus 100 may determine the social relationship between the plurality of users based on clothes worn by the users, facial expressions of the users, physical contact between the users, and the like.

In operation S830, the electronic apparatus 100 may acquire group profile information corresponding to each of the groups.

The electronic apparatus 100 may acquire group profile information based on a social relationship between the groups. For example, the electronic apparatus 100 may determine a social relationship of a group with two users as a married couple or a dating couple. The electronic apparatus 100 may acquire group profile information by analyzing facial expressions, clothes, and physical contact between the users based on the social relationship of the users, i.e., a married couple or a dating couple.

The electronic apparatus 100 may acquire group profile information of each of the groups.

In operation S840, the electronic apparatus 100 may create group content corresponding to each of the groups based on the group profile information and context information.

The electronic apparatus 100 may create group content corresponding to the groups based on common context information. The electronic apparatus 100 may create a plurality of pieces of group content in real time.

For example, based on context information of a rainy day, the electronic apparatus 100 may determine an advertisement element for each of the groups.

In operation S850, the electronic apparatus 100 may display group content on a display area of a screen.

The electronic apparatus 100 may display created group content on an area of the screen which corresponds to a location of a group. The electronic apparatus 100 may display a plurality of pieces of group content on a single screen. The electronic apparatus 100 may dynamically display group content as the location of the group changes.

Figure 9A:
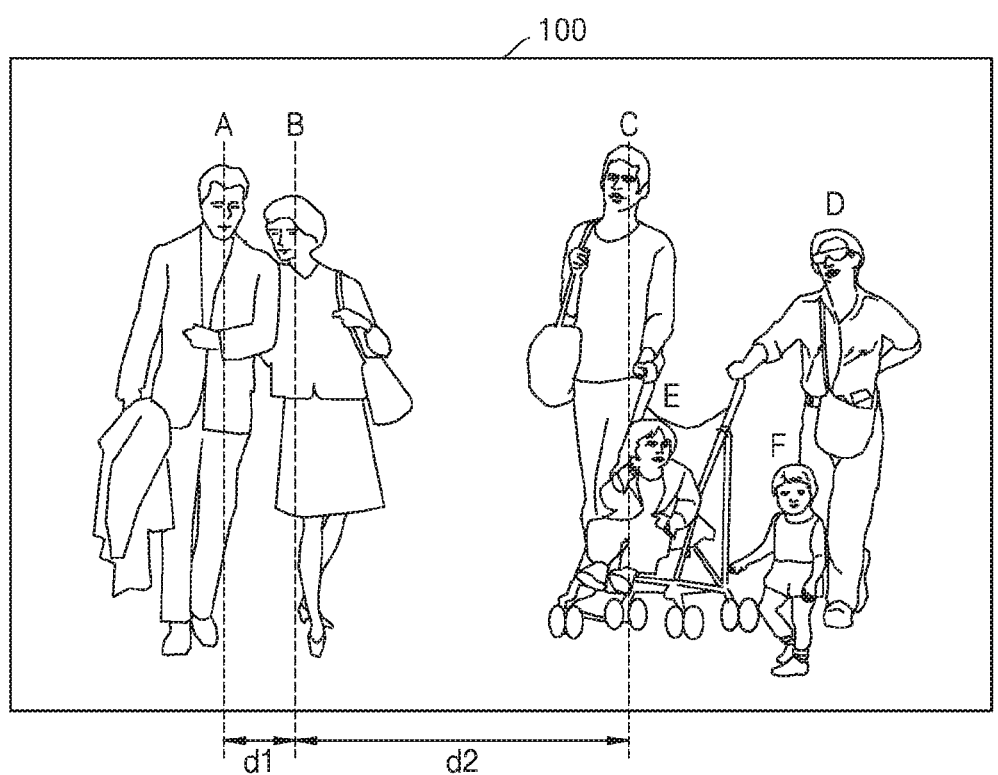
FIGS. 9A and 9B are diagrams illustrating a method of dividing a plurality of users into groups, according to an exemplary embodiment.
Figure 9B:
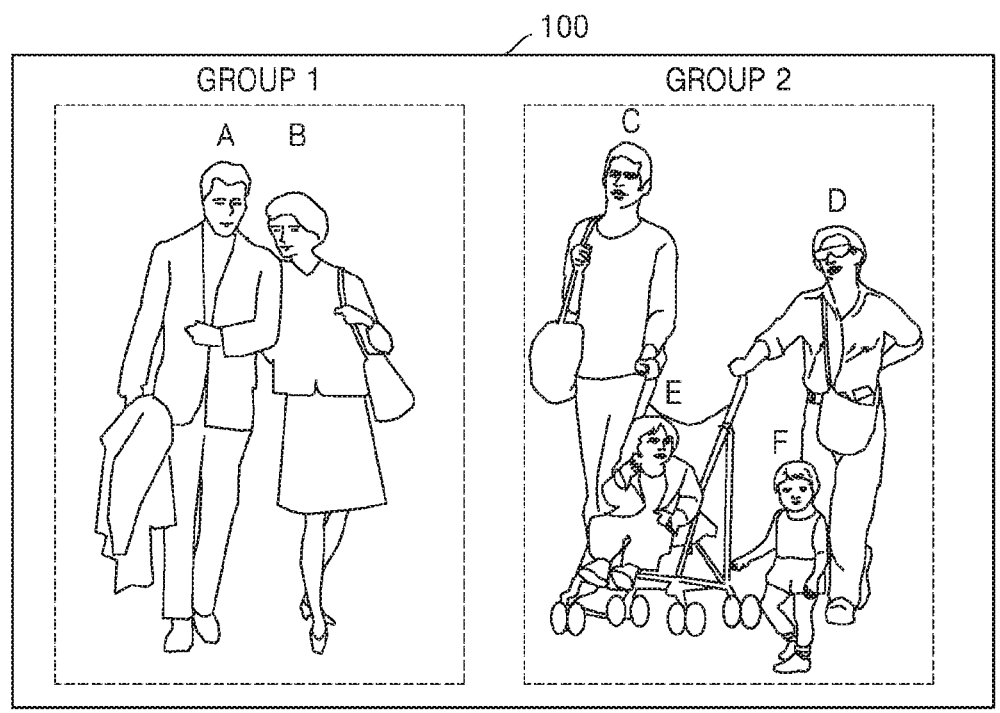

FIGS. 9A and 9B are diagrams for describing a method of dividing a plurality of users into groups, according to an exemplary embodiment.

As shown in FIG. 9A, the electronic apparatus 100 may acquire a captured image of the plurality of users. The electronic apparatus 100 may group the users based on a distance between the users.

For example, the electronic apparatus 100 may acquire an image of six users, i.e., users A through F. The electronic apparatus 100 may measure distances between the users A through F. The electronic apparatus 100 may compare the measured distances between the users A through F. For example, the electronic apparatus 100 may compare a distance d1 between the users A and B and a distance d2 between the users B and C. When the distance d2 is greater than the distance d1, the electronic apparatus 100 may determine that the users B and C are not in a group. Also, when the distance d1 is smaller than a predetermined distance, the electronic apparatus 100 may determine that the users A and B are companions and group the users A and B. Likewise, the electronic apparatus 100 may group the users C through F based on distances between the users C through F.

As shown in FIG. 9B, the electronic apparatus 100 may group the users A and B as 'GROUP 1,' and group the users C through F as 'GROUP 2.'

The electronic apparatus 100 may acquire group profile data of each of the groups.

The electronic apparatus 100 may acquire group profile data by analyzing users of each of the groups. The electronic apparatus 100 may determine a relationship between the users of each of the group based on facial expressions of the users, clothes of the users, physical contact between the users, and the like.

For example, the electronic apparatus 100 may determine GROUP 1 as a couple when ages of the users A and B of GROUP 1 are similar and there is a physical contact between the users A and B and thus the users A and B are close to one another.

Also, the electronic apparatus 100 may determine GROUP 2 as a family when the users E and F are younger than the users C and D, and facial expressions of the users C through F are similar to one another.

The electronic apparatus 100 may create customized content for each of the groups based on determined characteristics of the groups. In particular, the electronic apparatus 100 may determine advertisement elements based on group profile data, and create content based on the advertisement elements.

The electronic apparatus 100 may create the content by individually analyzing profile data of each of the users and analyzing overall profile data of each of the groups.

Figure 10:
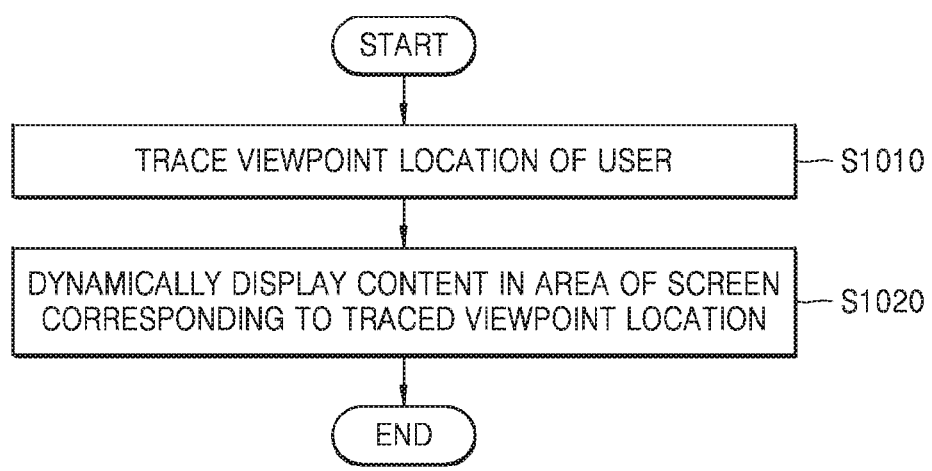
FIG. 10 is a flowchart of a method of dynamically displaying content on a display screen according to viewpoint locations of a user, according to an exemplary embodiment.

FIG. 10 is a flowchart of a method of dynamically displaying content on a display screen according to viewpoint locations of a user, according to an exemplary embodiment.

In operation S1010, the electronic apparatus 100 may trace a viewpoint location of the user. In this case, the "viewpoint location" may indicate a location at which the user's viewpoint is focused on the screen.

The electronic apparatus 100 may capture an image of at least a portion of the body of the user, including the eyes of the user. The eyes of the user may be used as a reference point for determining a direction in which the user is observing the display screen. The electronic apparatus 100 may capture real-time images including the user.

The electronic apparatus 100 may determine the viewpoint location of the user based on the captured images of the user. The electronic apparatus 100 may analyze directions of the eyes of the user and a location of the user in the captured images to determine a portion of the screen of the electronic apparatus 100 that the user is observing. The viewpoint location may be indicating a portion on the screen at which the viewpoint of the user is located. The user may have a relative location with respect to the electronic apparatus 100.

In operation S1020, content may be dynamically displayed on an area of the screen corresponding to the traced viewpoint location.

The electronic apparatus 100 may determine a content display area based on the viewpoint location of the user. Based on the viewpoint location of the user, the electronic apparatus 100 may determine, from among all areas of the screen, a display area as an area that is recognized by the user.

According to an exemplary embodiment, the content display area of the screen may be determined based on a current shape of the electronic apparatus 100. According to an exemplary embodiment, the content display area of the screen may vary according to properties of the screen included in the electronic apparatus 100. The properties of the screen may include, but is not limited to, an arrangement of the screen on the electronic apparatus 100, an external shape of the electronic apparatus 100, the number of screens, a size of the screen, and a shape of the screen.

Figure 11:
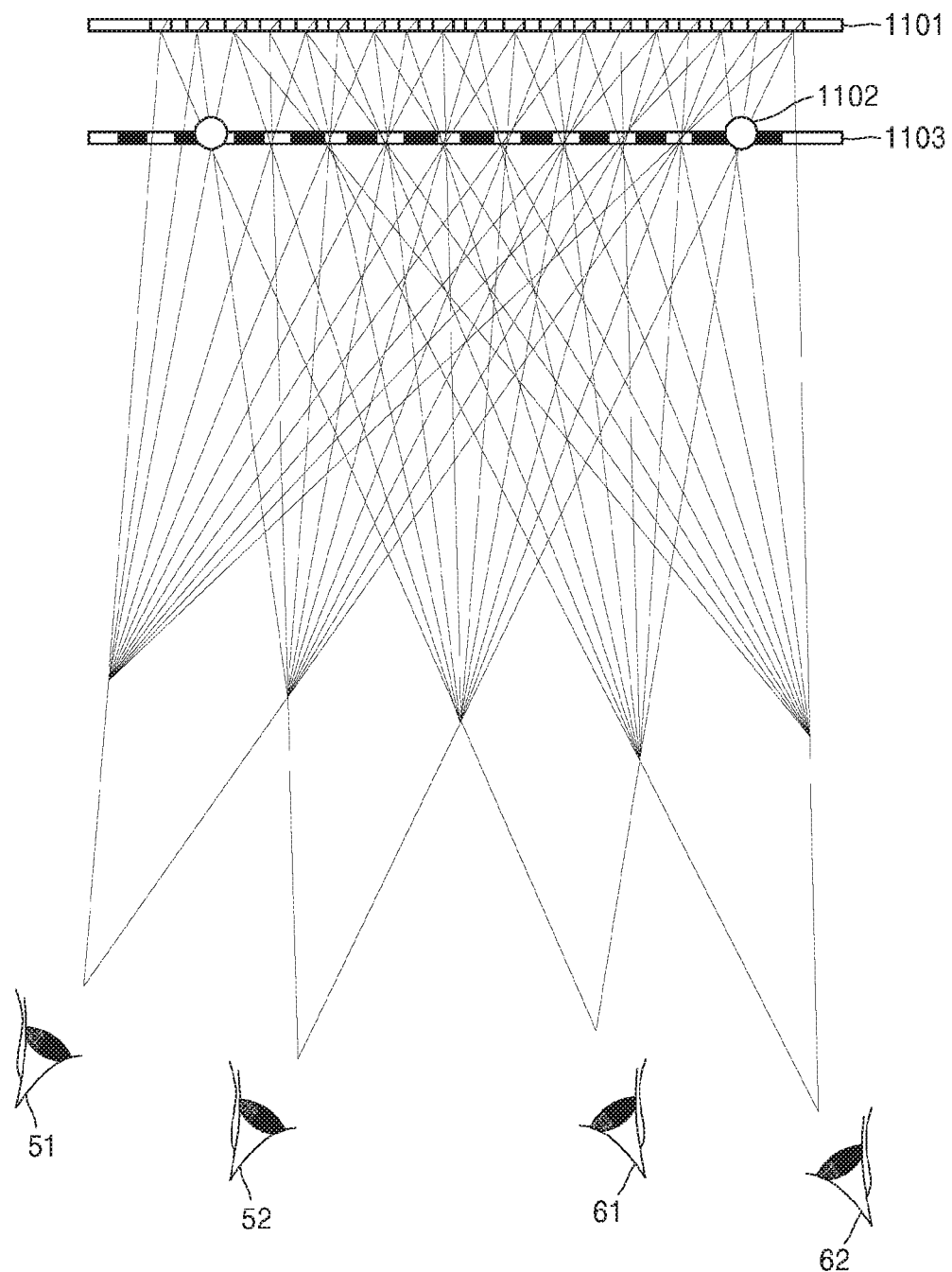
FIG. 11 is a diagram illustrating determining of a display screen corresponding to viewpoint locations of a user, according to an exemplary embodiment.

FIG. 11 is a diagram for describing determining of a display screen corresponding to viewpoint locations of a user, according to an exemplary embodiment.

As shown in FIG. 11, a camera 1102 may capture images of a user to trace viewpoints of the user. A light-emitting diode (LED) array 1101 may show images and videos to the user through a grid screen 1103.

The camera 1102 may trace the viewpoints of the user in real time. According to an exemplary embodiment, the camera 1102 may individually trace viewpoints of a left eye 51 and a right eye 52 of a left side user. The electronic apparatus 100 may determine a view range of the left eye 51 and the right eye 52. The electronic apparatus 100 may display content on the grid screen 1103 according to an angle of view of the left side user.

According to another exemplary embodiment, the electronic apparatus 100 may individually trace viewpoints of a left eye 61 and a right eye 62 of a right side user. The electronic apparatus 100 may display content on the grid screen 1103 according to an angle of view of the right side user.

The electronic apparatus 100 may control the grid screen 1103 such that content is displayed within a range of angle of view of a user.

Figure 12:
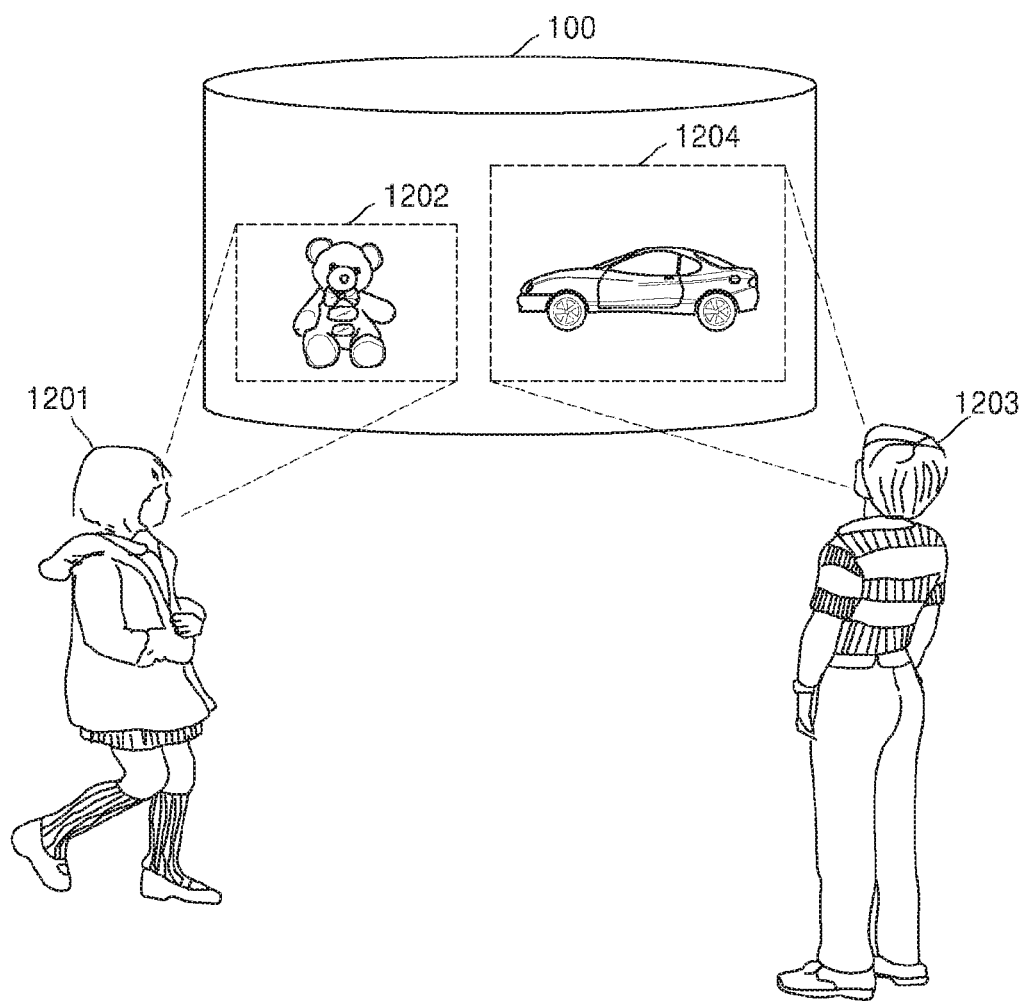
FIG. 12 is a diagram illustrating displaying of customized content to a plurality of users on a cylindrical display apparatus, according to an exemplary embodiment.

FIG. 12 is a diagram for describing displaying of customized content to a plurality of users on a cylindrical display apparatus, according to an exemplary embodiment.

According to an exemplary embodiment, the electronic apparatus 100 may be a cylindrical 3-dimensional (3D) display apparatus. For example, the electronic apparatus 100 may be, but is not limited to, a display apparatus that is provided on a pillar or a wall of a shopping mall or a hotel.

The electronic apparatus 100 may acquire images of two users. The electronic apparatus 100 may determine a partial area 1202 of a screen as an area corresponding to a viewpoint location of a left side user 1201. Also, the electronic apparatus 100 may determine a partial area 1204 on a screen as an area corresponding to a viewpoint location of a right side user 1203.

The electronic apparatus 100 may determine a personal advertisement element for each of the users by using respective user profile information and context information of the left side user 1201 and the right side user 1203. The electronic apparatus 100 may create personal content by using the personal advertisement elements.

For example, the electronic apparatus 100 may create content about dolls to the left side user 1201 based on the user profile information and display the content on the partial area 1202 of the screen. Also, the electronic apparatus 100 may create content about cars to the right side user 1203 based on the user profile information and display the content on the partial area 1204 of the screen.

The electronic apparatus 100 may display personal advertisement content for each user on a cylindrical display to increase advertisement effects of the content.

Figure 13:
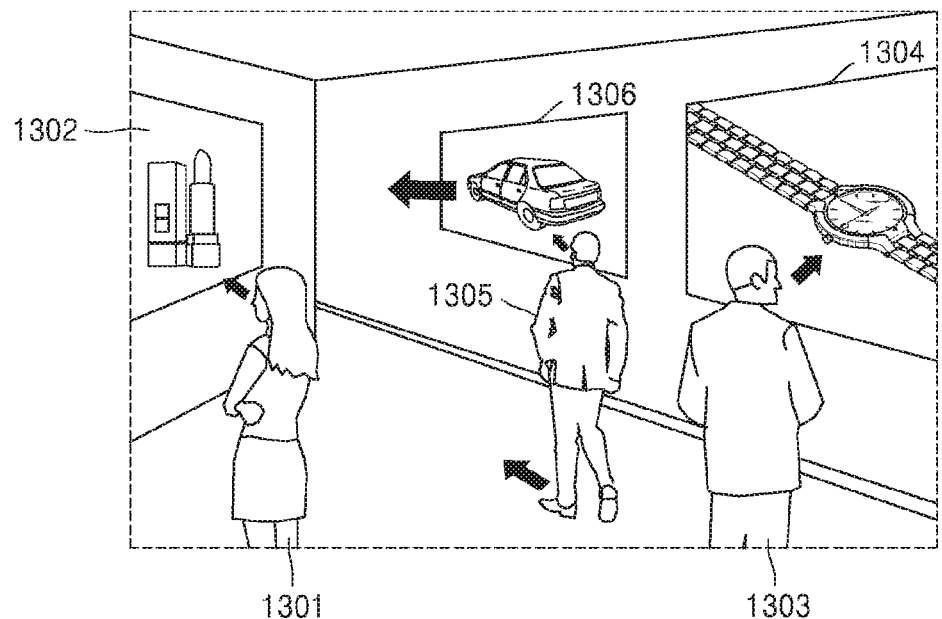
FIG. 13 is a diagram illustrating dynamically displaying content to a plurality of users on a display apparatus provided in a passage, according to an exemplary embodiment.

FIG. 13 is a diagram for describing dynamically displaying content to a plurality of users on a display apparatus provided in a passage, according to an exemplary embodiment.

According to an exemplary embodiment, the electronic apparatus 100 may increase a flat screen provided on two walls of a passage. The electronic apparatus 100 may display content on the flat screen while users are moving.

The electronic apparatus 100 may change any one of a color, a location, a shape, and a size of the flat screen to dynamically display content.

For example, as shown in FIG. 13, the electronic apparatus 100 may detect a first user 1301, a second user 1303, and a third user 1305.

The electronic apparatus 100 may determine a first screen area 1302 corresponding to the first user 1301, a second screen area 1304 corresponding to the second user 1303, and a third screen area 1306 corresponding to the third user 1305.

The electronic apparatus 100 may create content about the first user 1301 by using profile information of the first user 1301 and context information of the electronic apparatus 100. The electronic apparatus 100 may display the content on the first screen area 1302 to thus display customized advertisement content for the first user 1301. For example, when the first user 1301 is determined as a woman in her twenties who prefers fancy items such as a red lipstick, content about lipsticks with similar colors may be created. The electronic apparatus 100 may display the content about lipsticks on the first screen area 1302.

The electronic apparatus 100 may change a display area by tracing varying viewpoint locations of a user as the user moves. For example, when the third user 1305 is moving in the direction of an arrow, the electronic apparatus 100 may detect movements of the third user 1305 by tracing viewpoint locations of the third user 1305. The electronic apparatus 100 may change the third screen area 1306 as the viewpoint locations of the third user 1305 change. For example, the electronic apparatus 100 may dynamically display a car advertisement content corresponding to the third user 1305 on the third screen area 1306 that is changed. In particular, the electronic apparatus 100 may create content in which a car moves in a moving direction of the third screen area 1306 and display the content.

Figure 14:
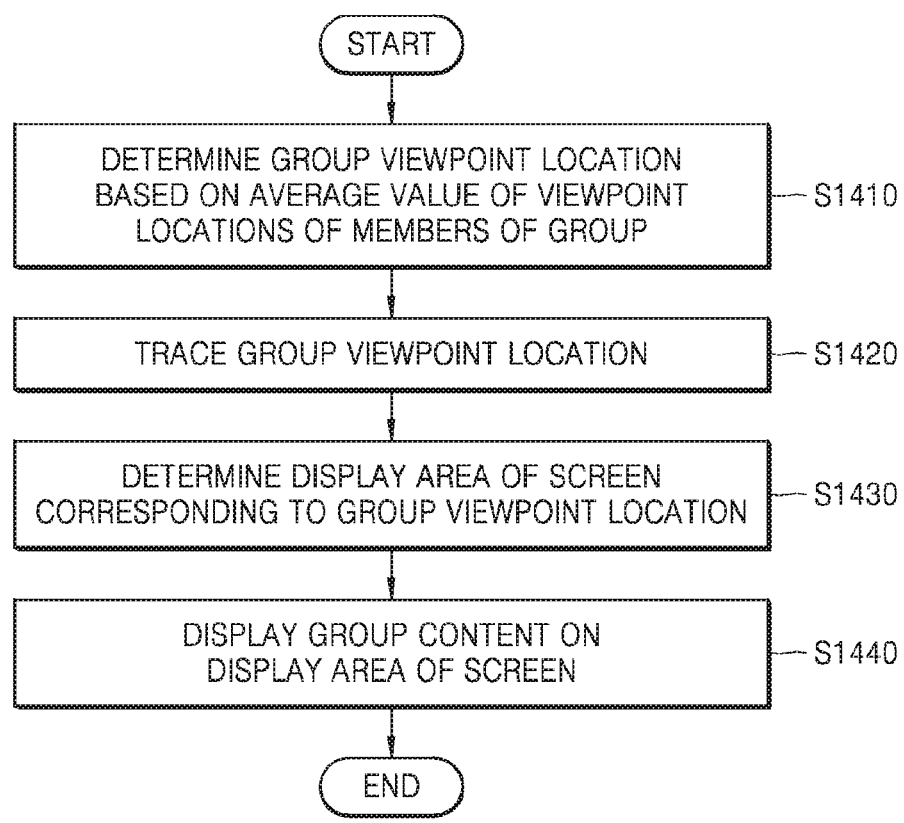
FIG. 14 is a flowchart of a method of displaying content corresponding to respective groups, performed by an electronic apparatus, according to an exemplary embodiment.

FIG. 14 is a flowchart of a method of displaying content corresponding to respective groups, performed by an electronic apparatus, according to an exemplary embodiment.

In operation S1410, the electronic apparatus 100 may determine a group viewpoint location based on an average value of viewpoint locations of members of a group. The electronic apparatus 100 may acquire viewpoint locations of the members of the group. The electronic apparatus 100 may calculate an average value of the viewpoint locations of the members. The electronic apparatus 100 may determine the average value of the viewpoint locations as the group viewpoint location. The electronic apparatus 100 may determine an area of a screen that corresponds to the group viewpoint location as an area of the screen of the group.

In operation S1420, the electronic apparatus 100 may trace the group viewpoint location.

The electronic apparatus 100 may trace the group viewpoint location in real time by using a camera. When viewpoint locations of users change, the electronic apparatus 100 may calculate an average of the viewpoint locations of the users in real time.

In operation S1430, the electronic apparatus 100 may determine a display area of the screen that corresponds to the group viewpoint location.

The electronic apparatus 100 may change the display area of the screen corresponding to the group viewpoint location as the group viewpoint location changes. For example, the electronic apparatus 100 may change a size, shape, location, etc. of the display area of the screen.

In operation S1440, the electronic apparatus 100 may display group content on the display area of the screen.

The electronic apparatus 100 may display the group content created per groups on the screen. The electronic apparatus 100 may display the group content on an area of the screen which corresponds to viewpoint locations of the groups.

Figure 15:
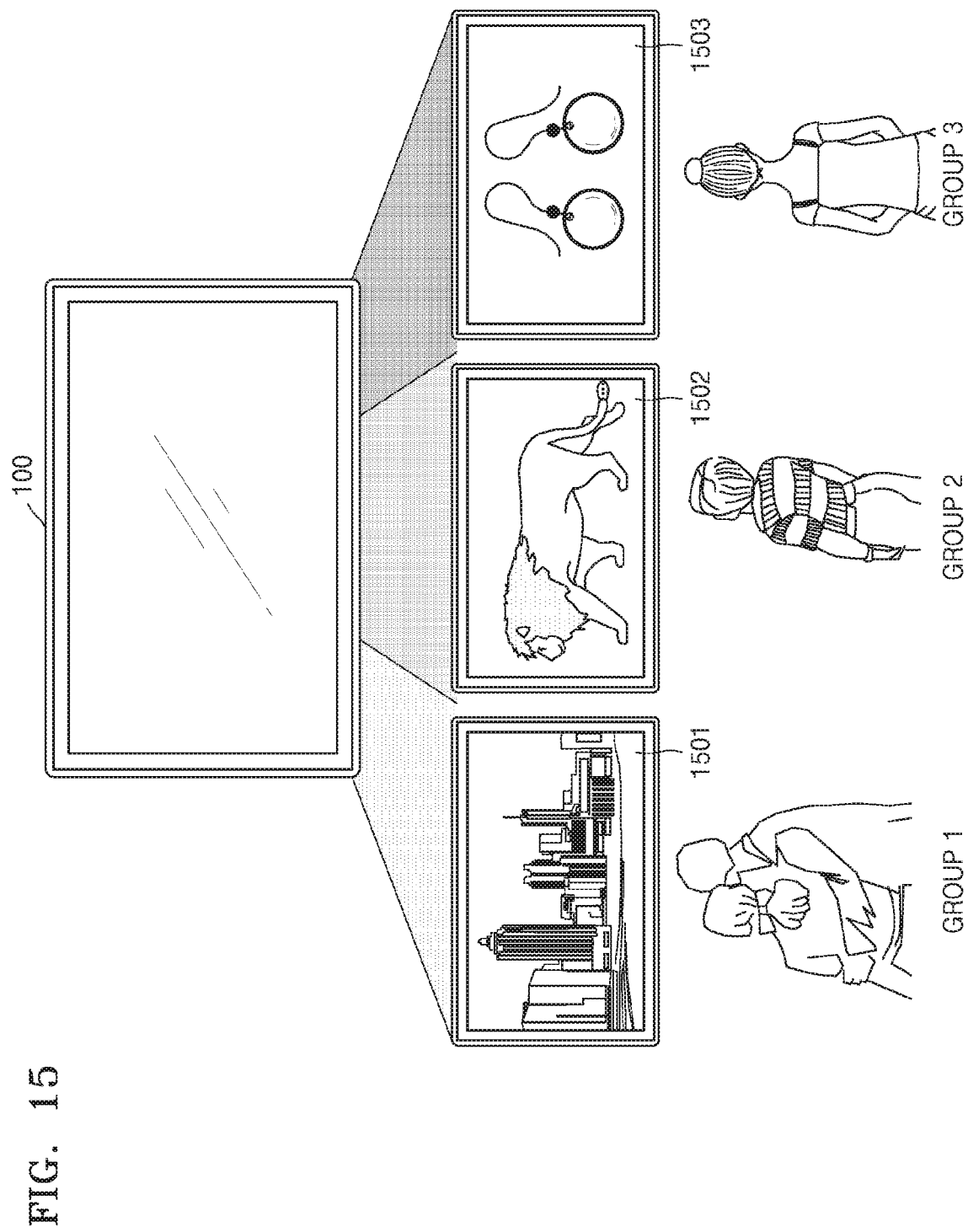
FIG. 15 is a diagram illustrating displaying of group content based on group profile data by an electronic apparatus, according to an exemplary embodiment.

FIG. 15 is a diagram for describing displaying of group content based on group profile data by an electronic apparatus, according to an exemplary embodiment.

According to an exemplary embodiment, the electronic apparatus 100 of FIG. 15 may include, but is not limited to, a flat display apparatus, a curved display apparatus, or a folder-type display apparatus.

As shown in FIG. 15, the electronic apparatus 100 may determine a group viewpoint location according to a location of a group. The electronic apparatus 100 may display group content according to the group viewpoint location.

The electronic apparatus 100 may display apartment advertisement content 1501 to GROUP 1 that is determined as a couple. The electronic apparatus 100 may display animal content 1502 to GROUP 2 that is determined as a preschooler. Also, the electronic apparatus 100 may display accessory content 1503 to GROUP 3 that is determined as a woman in her twenties.

Also, as the group viewpoint location changes, the electronic apparatus 100 may change a location at which content is displayed.

Figure 16:
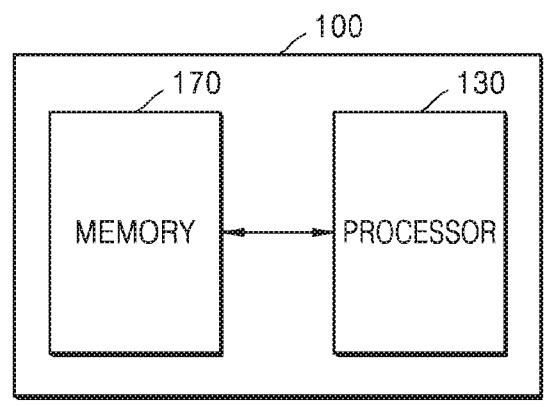
FIGS. 16 and 17 are diagrams of a configuration of an electronic apparatus according to an exemplary embodiment.
Figure 17:
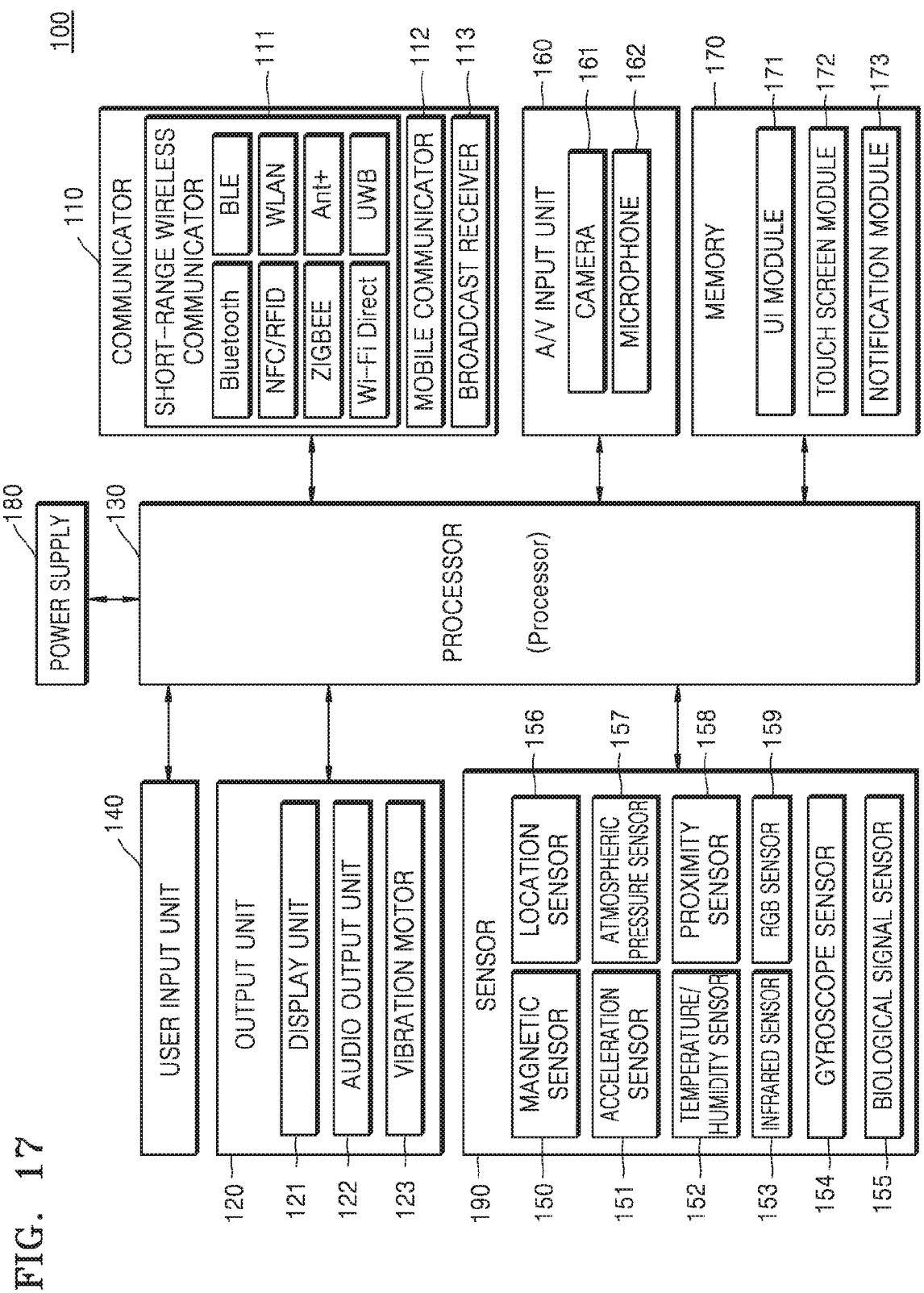

FIGS. 16 and 17 are diagrams of configuration of an electronic apparatus according to an exemplary embodiment.

According to an exemplary embodiment, the electronic apparatus 100 may be implemented as a large TV, but is not limited thereto. The electronic apparatus 100 may be implemented as an electronic apparatus including a display device, for example, a mobile terminal, a tablet personal computer (PC), a digital camera, a camcorder, a laptop computer, a desktop computer, an e-book terminal, a digital broadcasting terminal, a personal digital assistant (PDA), a portable multimedia player (PMP), a navigation device, an MP3 player, a wearable device, and the like. Also, the electronic apparatus 100 may be a fixed type apparatus or a portable apparatus.

As shown in FIG. 16, the electronic apparatus 100 according to some exemplary embodiments may include a processor 130 and a memory 170. However, elements shown in FIG. 16 are not essential elements of the electronic apparatus 100. The electronic apparatus 100 may include more or less elements that those shown in FIG. 16.

For example, as shown in FIG. 17, the electronic apparatus 100 according to some exemplary embodiments may include the memory 170 and the processor 130, and furthermore, a user input unit 140, a communicator 110, an output unit 120, a sensor 190, and an audiovisual (A/V) input unit 160.

The communicator 110 may include one or more elements that allow communication between the electronic apparatus 100 and an external device or a server. For example, the communicator 110 may include a short-range wireless communicator 111, a mobile communicator 112, and a broadcast receiver 113.

The short-range wireless communicator 111 may include, but is not limited to, a Bluetooth communicator, a Bluetooth low energy (BLE) communicator, a near field communication unit, a wireless local area network (WLAN) communicator, a ZigBee communicator, an Infrared Data Association (IrDA) communicator, a Wi-Fi Direct (WFD) communicator, an ultra wideband (UWB) communicator, an Ant+ communicator, and the like.

The mobile communicator 112 may transmit and receive wireless signals to and from at least one of a base station, an external terminal, or a server on a mobile communication network. The wireless signals may include audio call signals, video call signals, or various types of data transmitted and received in text/multimedia messages.

The broadcast receiver 113 may receive predetermined advertisement elements. The communicator 110 may acquire content information, context information, user's preference information, brand name information, and the like from an external device, a user's input, an external server, and the like.

The user input unit 140 may indicate a unit by which a user inputs signals to control the electronic apparatus 100. For example, the user input unit 140 may include, but is not limited to, a key pad, a dome switch, a touchpad (capacitive, resistive, infrared, surface acoustic wave, integral strain gauge, piezoelectric, etc.), a jog wheel, and a jog switch.

The user input unit 140 may receive a user input for controlling content displayed on the electronic apparatus 100. Also, the user input unit 140 may receive a user input for inputting user's preference information.

The processor 130 generally controls overall operations of the electronic apparatus 100. For example, the processor 130 may execute programs stored in the memory 170 to control overall operations of the user input unit 140, the output unit 120, the sensor 190, the communicator 110, the A/V input unit 160, and the like.

The processor 130 may create at least one piece of content based on user profile information and context information. Also, the processor 130 may control the electronic apparatus 100 to dynamically display the content on a screen of the electronic apparatus 100.

The output unit 120 may output audio signals, video signals, or vibration signals, and include a display unit 121, an audio output unit 122, and a vibration motor 123.

The display unit 121 may output and display information processed by the electronic apparatus 100. For example, the display unit 121 may display content. When the display unit 121 and a touchpad are layered and thus provided as a touch screen, the display unit 121 may be used as an output unit and an input unit. The display unit 121 may include at least one of a liquid crystal display (LCD) device, a thin film transistor-liquid crystal display (TFT-LCD) device, an organic light-emitting diode (OLED) device, a flexible display device, a3D display device, and an electrophoresis display device.

Also, the electronic apparatus 100 may include two or more display units 121 according to implementation of the electronic apparatus 100. The two or more display units 121 may be arranged to face each other by using a hinge. Alternatively, the two or more display units 121 may be separately arranged on two surfaces of the electronic apparatus 100. However, the arrangement of the two or more display units 121 is not limited to the above.

The audio output unit 122 may output audio data that is received from the communicator 110 or stored in the memory 170. Also, the audio output unit 122 may output audio signals related to functions (e.g., schedule reception sound, message reception sound, and notification sound) performed by the electronic apparatus 100. The audio output unit 122 may include a speaker, a buzzer, etc.

The vibration motor 123 may output vibration signals. For example, the vibration motor 123 may output vibration signals corresponding to output of audio data or video data (e.g., schedule reception sound, message reception sound, etc.). Also, the vibration motor 123 may output vibration signals when a touch input is input on a touch screen.

The A/V input unit 160 may be provided to input audio signals or video signals, and may include a camera 161 and a microphone 162. The camera 161 may acquire image frames of, for example, still images or moving images through an image sensor in a video call mode or a photography mode. Images captured through the image sensor may be processed by the processor 130 or a separate image processor.

The image frames processed by the camera 161 may be stored in the memory 170 or transmitted outside the electronic apparatus 100 via the communicator 110. Two or more cameras 161 may be provided depending on configuration of the electronic apparatus 100.

The microphone 162 may receive external audio signals and process the received external audio signals into electric audio data. For example, the microphone 162 may receive audio signals from an external device or a person. The microphone 162 may use various noise removing algorithms to remove noise generated during a process of receiving the external audio signals.

A Global Positioning System (GPS) module may receive position information from a plurality of GPS satellites.

The sensor 190 may include at least one of, but is not limited to, a magnetic sensor 150, an acceleration sensor 151, a temperature/humidity sensor 152, an infrared sensor 153, a gyroscope sensor 154, a biological signal sensor 155, a location sensor (e.g., GPS) 156, an atmospheric pressure sensor 157, a proximity sensor 158), and an RGB sensor (illuminance sensor) 159.

The sensor 190 may detect context of the electronic apparatus 100, for example, whether the electronic apparatus 100 is being worn, a location of the electronic apparatus 100, a contact between the electronic apparatus 100 and a user, weather status, and the like. Then, the sensor 190 may generate sensing signals for control operations of the electronic apparatus 100. Also, the sensor 190 may detect whether power is supplied by a power supply 180 and external status of the electronic apparatus 100.

The acceleration sensor 151 is a device capable of converting changes of acceleration in a certain direction into electric signals. The acceleration sensor 151 is widely used along with the development of micro-electromechanical systems (MEMS) technology.

The acceleration sensor 151 may include various types of technology, for example, measuring large acceleration for detecting collision in airbag systems of cars, and measuring small acceleration for detecting and inputting detailed movements of human hands for games and the like. The acceleration sensor may be configured by including two or three axes in a single package. In some environments, only a Z-axis may be necessary. Therefore, when it is necessary to use an acceleration sensor in an X-axis direction or a Y-axis direction rather than a Z-axis direction, a separate piece of substrate may be used to make the acceleration sensor stand on a main substrate.

The proximity sensor 158 may detect an object approaching the electronic apparatus 100 or an object nearby the electronic apparatus 100 without mechanical contact. The proximity sensor 158 may detect a nearby object by using changes of an AC magnetic field, changes of a magnetostatic field, or a variance rate of capacitance. Two or more proximity sensors 158 may be included according to configuration.

A pressure sensor may detect whether pressure is applied on the electronic apparatus 100 and a magnitude of the pressure. The pressure sensor may be provided on a portion of the electronic apparatus 100 where pressure detection is required, depending on a usage environment. When the pressure sensor is provided on the display unit 121, according to signals output from the pressure sensor, a touch input via the display unit 121 and a force touch input that applies greater pressure than the touch input may be distinguishable. Also, according to the signals output from the pressure sensor, a magnitude of the pressure applied to the display unit 121 when the force touch input is input may be detectable.

The gyroscope sensor 154 may measure angular velocity, in other words, a direction in which an object rotates with respect to a reference direction.

The biological signal sensor 155 may include at least one of, for example, an EMG (electromyography) sensor, an electrodermal activity (EDA) sensor, a skin temperature measurement device, a blood volume pulse measurement device, an electrocardiogram (ECG) sensor, a respiration sensor, a blood pressure measurement device, and a heart rate measurement device. The EMG sensor may indicate a sensor capable of detecting action potential of muscles. The EDA sensor may indicate as sensor capable of measuring conductivity of the skin. The skin temperature measurement device may include a sensor capable of detecting temperature of a skin surface. The blood volume pulse measurement device may indicate a device capable of measuring an amount of blood flowing in blood vessels. The ECG sensor may indicate a sensor capable of detecting potential of heartbeats on a body surface. The respiration sensor may indicate a sensor capable of measuring an amount and speed of respiration. The heart rate measurement device may be capable of measuring the number of times that the heart beats per a unit of time.

Functions of other sensors will not be described in detail since the functions may be intuitively understood by one of ordinary skill in the art from the names of the sensors.

The memory 170 may store programs for processing and controlling operations of the processor 130. Also, the memory 170 may store input/output data (e.g., applications, written content, multimedia content, transcriptions, etc.).

The memory 170 may include at least one of a flash memory type storage medium, a hard disk type storage medium, a multimedia card micro type storage medium, a card type storage medium (e.g., a secure digital (SD) memory card, an xD memory card, or the like), random access memory (RAM), static random access memory (SRAM), read-only memory (ROM), electrically erasable programmable read-only memory (EEPROM), programmable read-only memory (PROM), magnetic memory, a magnetic disc, and an optical disc. Also, the electronic apparatus 100 may operate a web storage or a cloud server which performs a storage function of the memory 170 on the Internet.

The programs stored in the memory 170 may be divided into a plurality of modules according to functions of the programs, for example, a user interface (UI) module 171, a touch screen module 172, and a notification module 173.

The memory 170 may store the programs for processing and controlling of the processor 130, and may temporarily store input/output data (e.g., phonebook, messages, still images, moving images, etc.).

The UI module 171 may provide a special UI and graphic user interface (GUI) in connection with the electronic apparatus 100 for each of the applications.

The touch screen module 172 may detect a touch gesture input by the user on the touch screen, and transmit information about the touch gesture to the processor 130. According to an exemplary embodiment, the touch screen module 172 may detect and analyze touch codes. The touch screen module 172 may be configured as separate hardware that includes a controller.

The notification module 173 may send schedule information to the processor 130.

The power supply 180 may be controlled by the processor 130 to receive external power and internal power and supply required power for operations of elements. Also, the, power supply 180 may be provided as a battery that is detachable from the electronic apparatus 100 to be charged and attachable to the electronic apparatus 100 to supply power to the electronic apparatus 100.

The exemplary embodiments can be written as computer programs and can be implemented in digital computers that execute the programs using a computer-readable recording medium. Also, the structure of data used in the aforementioned exemplary embodiments may be recorded in the computer-readable recording medium by using various methods. Also, the aforementioned exemplary embodiments may be can be implemented through computer-readable code/instructions, such as a computer-executed program module, stored in/on a medium, e.g., a computer-readable medium. For example, when software modules or algorithms are involved, these software modules may be stored as program instructions or computer-readable codes executable on a processor on a computer-readable recording medium.

The computer-readable medium may be a random computer-accessible medium, and may include volatile media, non-volatile media, separable media, and/or non-separable media. Also, the computer-readable medium may include, but is not limited to, recording media, such as magnetic storage media (e.g., ROM, floppy disks, or hard disks) and optical recording media (e.g., CD-ROMs, or DVDs). Also, the computer-readable medium may correspond to any computer storage media and communication media.

The computer-readable recording media can also be distributed over network coupled computer systems. Data, such as programming instructions and codes, stored in the distributed computer-readable recording media may be executed by at least one computer.

The particular implementations shown and described herein are illustrative examples of exemplary embodiments and are not intended to otherwise limit the scope of exemplary embodiments in any way. For the sake of brevity, conventional electronics, control systems, software development and other functional aspects of the systems may not be described in detail.

The use of any and all examples, or exemplary language (e.g., "such as") provided herein, is intended merely to better illuminate exemplary embodiments and does not pose a limitation on the scope of exemplary embodiments unless otherwise claimed.

Moreover, no item or component is essential to the practice of exemplary embodiments unless the element is specifically described as "essential" or "critical."

While one or more exemplary embodiments have been described with reference to the figures, it will be understood by those of ordinary skill in the art that various changes in form and details may be made therein without departing from the spirit and scope as defined by the following claims.

As exemplary embodiments allow for various changes, the inventive concept is not limited to the above exemplary embodiments, and it is to be appreciated that all changes, equivalents, and substitutes that do not depart from the spirit and technical scope of the inventive concept are encompassed in the exemplary embodiments. It should be understood that exemplary embodiments described herein should be considered in a descriptive sense only and not for purposes of limitation.

The scope of the exemplary embodiments is defined by the following claims rather than the detailed description, and it will be understood that all modifications and modified implementations that can be derived from the meaning and scope of the claims and their equivalents are within the scope of the exemplary embodiments.

Unless clearly defined as "at least one of a1, at least one of a2, and at least one of a3," the expression "at least one selected from a1, a2, and a3" should not be understood as "at least one a1, at least one a2, and at least one a3."

What is claimed is:

1. A method of providing content, the method comprising:
   acquiring user profile information from an image of each of a plurality of users of an electronic apparatus configured to provide content to the each user, the image being obtained using a camera;
   acquiring context information from a surrounding environment of the electronic apparatus by using either one or both of a sensor and the camera;
   determining an advertisement element based on the user profile information and the context information;
   generating contents to be provided to the plurality of users by using the determined advertisement element;
   displaying the contents on a screen; and
   tracing a viewpoint location of each of the plurality of users on the screen and dynamically displaying the contents on the screen corresponding to the traced viewpoint location,
   wherein the acquiring the user profile information comprises:
   dividing the image of the each user into a plurality of areas according to a silhouette of the each user; and
   acquiring the user profile information from the plurality of areas according to the silhouette of the each user,
   wherein each area, among the plurality of areas, corresponds to a body part of a plurality of body parts of the each user,
   wherein the user profile information comprises information that corresponds to each body part of the plurality of body parts of the each user,
   wherein the advertisement element corresponds to each body part of the plurality of body parts of the each user, and
   wherein the dynamically displaying of the contents comprises determining partial display areas corresponding to the plurality of users on the screen, the partial display areas being different from each other on the screen, displaying the contents on the partial display areas on the screen, and changing the partial display areas on the screen according to movements of the plurality of users.

2. The method of claim 1, wherein the advertisement element comprises at least one among an item to be recommended to the each user, a background screen of the content, background music of the content, characters appearing in the content, and a story of the content.

3. The method of claim 1, wherein the user profile information comprises at least one among gender, age, ethnicity, skin status, health status, makeup style, accessory style, clothing style, preferred brand name, personality, purchasing power, and biological information of the each user.

4. The method of claim 1, wherein the acquiring the user profile information comprises:
   capturing images of the plurality of users of the electronic apparatus;
   dividing the plurality of users into a plurality of groups based on distances between the plurality of users; and
   acquiring group profile information corresponding to each group among the plurality of groups,
   wherein the generating the contents comprises providing group content corresponding to each group among the plurality of groups based on the group profile information and the context information.

5. The method of claim 1, wherein the context information comprises at least one among location information of the electronic apparatus, time information, weather information, holiday information, and current hot issue information.

6. The method of claim 1, wherein the dynamically displaying the content comprises changing at least one among a color, a location, a shape, and a size of the display areas of the screen corresponding to the viewpoint location of the each user and displaying the contents.

7. The method of claim 1, wherein the generating the contents comprises:
   generating a plurality of pieces of content by using the advertisement element.

8. The method of claim 4, further comprising:
   determining a group viewpoint location from an average of viewpoint locations of members of the plurality of groups;
   determining a display area of the screen corresponding to the group viewpoint location; and
   displaying the group content on the display area of the screen.

9. The method of claim 5, wherein the acquiring the context information comprises receiving the context information from a server or a separate preset apparatus that is within a certain distance of the electronic apparatus.

10. An electronic apparatus configured to provide content, the electronic apparatus comprising:
    a memory configured to store computer-executable instructions; and
    at least one processor configured to execute the computer-executable instructions to:
    acquire user profile information from an image of each of a plurality of users of the electronic apparatus, the image being obtained using a camera, acquire context information from a surrounding environment of the electronic apparatus by using either one or both of a sensor and the camera, determine an advertisement element based on the user profile information and the context information, generate contents to be provided to the plurality of users by using the determined advertisement element, and display the contents on a screen,
    wherein the at least one processor is further configured to execute the computer-executable instructions to:
    divide the image of the each user into a plurality of areas according to a silhouette of the each user; and
    acquire the user profile information from the plurality of areas according to the silhouette of the each user,
    wherein each area, among the plurality of areas, corresponds to a body part of a plurality of body parts of the each user,
    wherein the user profile information comprises information that corresponds to each body part of the plurality of body parts of the each user,
    wherein the advertisement element corresponds to each body part of the plurality of body parts of the each user, wherein the at least one processor is further configured to trace a viewpoint location of the each user on the screen and dynamically display the of contents on the screen corresponding to the traced viewpoint location, and wherein the at least one processor is further configured to determine partial display areas corresponding to the plurality of users on the screen, the partial display areas being different from each other on the screen, display the contents on the partial display areas on the screen, and change the partial display areas on the screen according to movements of the plurality of users.

11. The electronic apparatus of claim 10, wherein the at least one processor is configured to determine an advertisement element to be recommended to the each user based on the user profile information and the context information, and generate the content by using the determined advertisement element.

12. The electronic apparatus of claim 10, wherein the at least one processor is configured to divide the plurality of users, from images of the plurality of users of the electronic apparatus, into a plurality of groups based on distances between the plurality of users, acquire group profile information corresponding to each group among the plurality of groups, and provide group content corresponding to each group among the plurality of groups based on the group profile information and the context information.

13. The electronic apparatus of claim 11, wherein the advertisement element comprises at least one among an item to be recommended to the each user, a background screen of content, background music of the content, characters appearing in the content, and a story of the content.

14. A non-transitory computer-readable recording medium having recorded thereon a program, which, when executed by a computer, performs the method of claim 1.

* * * * *